US008958495B2

(12) United States Patent
Choi et al.

(10) Patent No.: US 8,958,495 B2
(45) Date of Patent: Feb. 17, 2015

(54) CODEBOOK DESIGN METHOD FOR MULTIPLE-INPUT MULTIPLE-OUTPUT (MIMO) COMMUNICATION SYSTEM AND METHOD FOR USING THE CODEBOOK

(75) Inventors: Jun il Choi, Seoul (KR); Bruno Clerckx, Seoul (KR); Ki Il Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 830 days.

(21) Appl. No.: 12/836,245

(22) Filed: Jul. 14, 2010

(65) Prior Publication Data

US 2011/0170621 A1 Jul. 14, 2011

(30) Foreign Application Priority Data

Jan. 8, 2010 (KR) ........................ 10-2010-0001509

(51) Int. Cl.
*H04B 7/02* (2006.01)
*H04L 25/03* (2006.01)
*H04L 5/00* (2006.01)

(52) U.S. Cl.
CPC ........ *H04L 25/03343* (2013.01); *H04L 5/0037* (2013.01)
USPC ............................ 375/267; 375/295; 375/259

(58) Field of Classification Search
USPC .......................................... 375/267, 295, 259
See application file for complete search history.

(56) References Cited

U.S. PATENT DOCUMENTS 8,559,482 B1 * 10/2013 Dong ............................ 375/146
2007/0286304 A1 12/2007 Kim et al.
2008/0186212 A1 * 8/2008 Clerckx et al. .................. 341/55
2008/0256163 A1 10/2008 Clerckx et al.
2008/0273612 A1 11/2008 Khojastepour et al.
2008/0298482 A1 * 12/2008 Rensburg et al. ............. 375/260
2008/0303701 A1 12/2008 Zhang et al.
2009/0268827 A1 * 10/2009 Clerckx et al. ................ 375/260
2009/0323841 A1 12/2009 Clerckx et al.
2010/0039928 A1 * 2/2010 Noh et al. ..................... 370/210
2011/0103493 A1 * 5/2011 Xia et al. ...................... 375/259
2011/0134848 A1 * 6/2011 Tamaki ......................... 370/328
2011/0182279 A1 * 7/2011 Ashikhmin et al. .......... 370/350
2011/0305291 A1 * 12/2011 Marzetta et al. .............. 375/267

FOREIGN PATENT DOCUMENTS

KR 10-2009-0101804 9/2009

OTHER PUBLICATIONS

Juho Lee, “Radio Technologies for IMT-Advanced,” *In Proc. of the IMT-Adv. Workshop in TTA*, Jun. 11, 2008, pp. 1-15, Seoul, Republic of Korea.
Hokyu Choi, “TGm Contribution List and Status Summary,” *IEEE 802.16 Broadband Wireless Access Working Group*, Mar. 5, 2009.
International Search Report mailed Apr. 26, 2011 in International Application No. PCT/KR2010/005286 (3 pages, in English).

* cited by examiner

*Primary Examiner* — Leila Malek
(74) *Attorney, Agent, or Firm* — NSIP Law

(57) ABSTRACT

A multiple-input multiple-output (MIMO) communication system and method using a codebook, are provided. A transmitter and at least one receiver included in the MIMO communication system may use at least one codebook from among a plurality of codebooks. Codeword matrices included in one of the codebooks may correspond to vectors included in a block diagonal matrix, and another codebook may be configured by rotating the vectors. The codeword matrices of the remaining codebooks may include the rotated vectors and random vectors.

20 Claims, 7 Drawing Sheets

CODEBOOK DESIGN METHOD FOR MULTIPLE-INPUT MULTIPLE-OUTPUT (MIMO) COMMUNICATION SYSTEM AND METHOD FOR USING THE CODEBOOK

CROSS-REFERENCE TO RELATED APPLICATION(S)

This application claims the benefit under 35 U.S.C. §119 (a) of Korean Patent Application No. 10-2010-0001509, filed on Jan. 8, 2010, in the Korean Intellectual Property Office, the entire disclosure of which is incorporated herein by reference for all purposes.

BACKGROUND

1. Field

The following description relates to a codebook that is used in a multiple-input multiple-output (MIMO) communication system.

2. Description of Related Art

Currently, researches are being conducted to provide various types of multimedia services and to support higher quality and higher speed of data transmission in a wireless communication environment. Accordingly, technology associated with a multiple-input multiple-output (MIMO) communication systems using multiple channels are in rapid development.

A MIMO communication system may include a base station and one or more terminals. In a downlink communication, the base station operates as a transmitter, and the terminal operates as a receiver.

The base station and the one or more terminals may use a codebook including a plurality of codeword matrices for quantizing a particular space. The plurality of codeword matrices may be generated according to a predetermined criterion and may be stored in the base station and the one or more terminals. The codebook may be used by the base station and the one or more terminals during wireless transmission/reception.

For example, in a downlink communication of a closed-loop MIMO communication system, a terminal may detect a channel formed between the base station and the terminal. The terminal may select a preferred codeword matrix from a plurality of codeword matrices included in a codebook based on the detected channel, and may provide the selected codeword to the base station. For example, the terminal may feedback information associated with the preferred codeword matrix to the base station. Using the codebook, the base station may verify a preferred codeword matrix based on the received feedback information. The base station may determine a precoding matrix based on the preferred codeword matrix and then precode one or more data streams using the preferred codeword matrix.

SUMMARY

In one general aspect, there is provided a transmitter for a multiple-input multiple-output (MIMO) communication system, the transmitter comprising a memory configured to store a codebook comprising at least one of 8×1 codeword matrices c1, c2, c3, c4, c5, c6, c7, c8, c9, c10, c11, c12, c13, c14, c15, and c16, and a precoder configured to precode a data stream to be transmitted based on the codebook, wherein the codeword matrices c1, c2, c3, c4, c5, c6, c7, c8, c9, c10, c11 , c12 , c13, c14, c15, and c16 are represented by the following Table:

| | |
|---|---|
| c1 = | 0.5000 |
| | 0.5000 |
| | 0.5000 |
| | 0.5000 |
| | 0 |
| | 0 |
| | 0 |
| | 0 |
| c2 = | 0.5000 |
| | 0.0000 + 0.5000i |
| | −0.5000 + 0.0000i |
| | −0.0000 − 0.5000i |
| | 0 |
| | 0 |
| | 0 |
| | 0 |
| c3 = | 0.5000 |
| | −0.5000 + 0.0000i |
| | 0.5000 − 0.0000i |
| | −0.5000 + 0.0000i |
| | 0 |
| | 0 |
| | 0 |
| | 0 |
| c4 = | 0.5000 |
| | −0.0000 − 0.5000i |
| | −0.5000 + 0.0000i |
| | 0.0000 + 0.5000i |
| | 0 |
| | 0 |
| | 0 |
| | 0 |
| c5 = | 0.5000 |
| | 0.3536 + 0.3536i |
| | 0.0000 + 0.5000i |
| | −0.3536 + 0.3536i |
| | 0 |
| | 0 |
| | 0 |
| | 0 |
| c6 = | 0.5000 |
| | −0.3536 + 0.3536i |
| | −0.0000 − 0.5000i |
| | 0.3536 + 0.3536i |
| | 0 |
| | 0 |
| | 0 |
| | 0 |
| c7 = | 0.5000 |
| | −0.3536 − 0.3536i |
| | 0.0000 + 0.5000i |
| | 0.3536 − 0.3536i |
| | 0 |
| | 0 |
| | 0 |
| | 0 |
| c8 = | 0.5000 |
| | 0.3536 − 0.3536i |
| | −0.0000 − 0.5000i |
| | −0.3536 − 0.3536i |
| | 0 |
| | 0 |
| | 0 |
| | 0 |
| c9 = | 0 |
| | 0 |
| | 0 |
| | 0 |
| | 0.5000 |
| | 0.5000 |
| | 0.5000 |
| | 0.5000 |
| c10 = | 0 |
| | 0 |
| | 0 |
| | 0 |
| | 0.5000 |
| | 0.0000 + 0.5000i |
| | −0.5000 + 0.0000i |
| | −0.0000 − 0.5000i |
| c11 = | 0 |

-continued

| | |
|---|---|
| | 0 |
| | 0 |
| | 0 |
| | 0.5000 |
| | −0.5000 + 0.0000i |
| | 0.5000 − 0.0000i |
| | −0.5000 + 0.0000i |
| c12 = | 0 |
| | 0 |
| | 0 |
| | 0 |
| | 0.5000 |
| | −0.0000 − 0.5000i |
| | −0.5000 + 0.0000i |
| | 0.0000 + 0.5000i |
| c13 = | 0 |
| | 0 |
| | 0 |
| | 0 |
| | 0.5000 |
| | 0.3536 + 0.3536i |
| | 0.0000 + 0.5000i |
| | −0.3536 + 0.3536i |
| c14 = | 0 |
| | 0 |
| | 0 |
| | 0 |
| | 0.5000 |
| | −0.3536 + 0.3536i |
| | −0.0000 − 0.5000i |
| | 0.3536 + 0.3536i |
| c15 = | 0 |
| | 0 |
| | 0 |
| | 0 |
| | 0.5000 |
| | −0.3536 − 0.3536i |
| | 0.0000 + 0.5000i |
| | 0.3536 − 0.3536i |
| c16 = | 0 |
| | 0 |
| | 0 |
| | 0 |
| | 0.5000 |
| | 0.3536 − 0.3536i |
| | −0.0000 − 0.5000i |
| | −0.3536 − 0.3536i |

The transmitter may further be configured to calculate a precoding matrix based on at least one codeword matrix among the codeword matrices c1, c2, c3, c4, c5, c6, c7, c8, c9, c10, c11, c12, c13, c14, c15, and c16, and precode the data stream based on the precoding matrix.

The transmitter may further comprise an information receiver configured to receive, from a receiver, feedback information associated with the at least one codeword matrix, wherein the precoder is further configured to precode the data stream based on the feedback information and the codebook.

The precoder may further be configured to calculate a precoding matrix based on a codeword matrix corresponding to the feedback information among the codeword matrices c1, c2, c3, c4, c5, c6, c7, c8, c9, c10, c11, c12, c13, c14, c15, and c16, and precode the data stream based on the precoding matrix.

The feedback information may comprise information associated with an index of a codeword matrix preferred by the receiver.

The transmitter may comprise eight transmit antennas.

In another general aspect, there is provided a transmitter for a MIMO communication system, the transmitter comprising a memory configured to store a codebook comprising at least one of 8×1 codeword matrices c1, c2, c3, c4, c5, c6, c7, c8, c9, c10, c11, c12, c13, c14, c15, and c16, and a precoder configured to precode a data stream to be transmitted based on the codebook, wherein the codeword matrices c1, c2, c3, c4, c5, c6, c7, c8, c9, c10, c11, c12, c13, c14, c15, and c16 are represented by the following Table:

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.3536 + 0.0000i |
| | 0.3536 − 0.0000i |
| | −0.3536 + 0.0000i |
| | 0.3536 |
| | −0.3536 + 0.0000i |
| | 0.3536 − 0.0000i |
| | −0.3536 + 0.0000i |
| c4 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c5 = | −0.3536 |
| | −0.3536 |
| | −0.3536 |
| | −0.3536 |
| | 0.3536 |
| | 0.3536 |
| | 0.3536 |
| | 0.3536 |
| c6 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c7 = | −0.3536 |
| | 0.3536 − 0.0000i |
| | −0.3536 + 0.0000i |
| | 0.3536 − 0.0000i |
| | 0.3536 |
| | −0.3536 + 0.0000i |
| | 0.3536 − 0.0000i |
| | −0.3536 + 0.0000i |
| c8 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c9 = | 0.3536 |
| | 0.2500 + 0.2500i |
| | 0.0000 + 0.3536i |
| | −0.2500 + 0.2500i |
| | 0.3536 |
| | 0.2500 + 0.2500i |
| | 0.0000 + 0.3536i |
| | −0.2500 + 0.2500i |
| c10 = | 0.3536 |
| | −0.2500 + 0.2500i |
| | −0.0000 − 0.3536i |

-continued

| | |
|---|---|
| | 0.2500 + 0.2500i |
| | 0.3536 |
| | −0.2500 + 0.2500i |
| | −0.0000 − 0.3536i |
| | 0.2500 + 0.2500i |
| c11 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c12 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c13 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c14 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c15 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c16 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |

In another general aspect, there is provided a transmitter for a MIMO communication system, the transmitter comprising a memory configured to store a codebook comprising at least one of 8×1 codeword matrices c1, c2, c3, c4, c5, c6, c7, c8, c9, c10, c11, c12, c13, c14, c15, and c16, and a precoder configured to precode a data stream to be transmitted based on the codebook, wherein the codeword matrices c1, c2, c3, c4, c5, c6, c7, c8, c9, c10, c11, c12, c13, c14, c15, and c16 are represented by the following Table:

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c4 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c5 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c6 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c7 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c8 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c9 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c10 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c11 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c12 = | −0.3536 |
| | −0.2500 + 0.2500i |

-continued

| | |
|---|---|
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |
| c13 = | 0.3536 + 0.0000i |
| | 0.2500 − 0.2500i |
| | 0.2500 − 0.2500i |
| | 0.0000 − 0.3536i |
| | 0.0000 − 0.3536i |
| | −0.2500 − 0.2500i |
| | −0.2500 − 0.2500i |
| | −0.3536 − 0.0000i |
| c14 = | 0.3536 + 0.0000i |
| | 0.0000 − 0.3536i |
| | −0.2500 − 0.2500i |
| | −0.2500 + 0.2500i |
| | −0.0000 + 0.3536i |
| | 0.3536 + 0.0000i |
| | 0.2500 − 0.2500i |
| | −0.2500 − 0.2500i |
| c15 = | 0.3536 + 0.0000i |
| | 0.2500 + 0.2500i |
| | −0.2500 + 0.2500i |
| | −0.3536 − 0.0000i |
| | 0.0000 − 0.3536i |
| | 0.2500 − 0.2500i |
| | 0.2500 + 0.2500i |
| | −0.0000 + 0.3536i |
| c16 = | 0.3536 + 0.0000i |
| | 0.3536 + 0.0000i |
| | 0.2500 + 0.2500i |
| | 0.2500 + 0.2500i |
| | −0.0000 + 0.3536i |
| | −0.0000 + 0.3536i |
| | −0.2500 + 0.2500i |
| | −0.2500 + 0.2500i |

In another general aspect, there is provided a transmitter for a MIMO communication system, the transmitter comprising a memory configured to store a codebook comprising at least one of 8×2 codeword matrices c1, c2, c3, c4, c5, c6, c7, c8, c9, c10, c11, c12, c13, c14, c15, and c16, and a precoder configured to precode a data stream to be transmitted based on the codebook, wherein the codeword matrices c1, c2, c3, c4, c5, c6, c7, c8, c9, c10, c11, c12, c13, c14, c15, and c16 are represented by the following Table:

| | | |
|---|---|---|
| c1 = | 0.3536 | −0.3536 |
| | 0.3536 | −0.3536 |
| | 0.3536 | −0.3536 |
| | 0.3536 | −0.3536 |
| | 0.3536 | 0.3536 |
| | 0.3536 | 0.3536 |
| | 0.3536 | 0.3536 |
| | 0.3536 | 0.3536 |
| c2 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c3 = | 0.3536 | −0.3536 |
| | −0.3536 + 0.0000i | 0.3536 − 0.0000i |
| | 0.3536 − 0.0000i | −0.3536 + 0.0000i |
| | −0.3536 + 0.0000i | 0.3536 − 0.0000i |
| | 0.3536 | 0.3536 |
| | −0.3536 + 0.0000i | −0.3536 + 0.0000i |
| | 0.3536 − 0.0000i | 0.3536 − 0.0000i |
| | −0.3536 + 0.0000i | −0.3536 + 0.0000i |
| c4 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c5 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c6 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c7 = | 0.3536 | −0.3536 |
| | −0.3536 + 0.0000i | 0.2500 + 0.2500i |
| | 0.3536 − 0.0000i | −0.0000 − 0.3536i |
| | −0.3536 + 0.0000i | −0.2500 + 0.2500i |
| | 0.3536 | 0.3536 |
| | −0.3536 + 0.0000i | −0.2500 − 0.2500i |
| | 0.3536 − 0.0000i | 0.0000 + 0.3536i |
| | −0.3536 + 0.0000i | 0.2500 − 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | 0.3536 | −0.3536 |
| | 0.2500 + 0.2500i | −0.3536 |
| | 0.0000 + 0.3536i | −0.3536 |
| | −0.2500 + 0.2500i | −0.3536 |
| | 0.3536 | 0.3536 |
| | 0.2500 + 0.2500i | 0.3536 |
| | 0.0000 + 0.3536i | 0.3536 |
| | −0.2500 + 0.2500i | 0.3536 |
| c10 = | 0.3536 | −0.3536 |
| | −0.2500 + 0.2500i | −0.0000 − 0.3536i |
| | −0.0000 − 0.3536i | 0.3536 − 0.0000i |
| | 0.2500 + 0.2500i | 0.0000 + 0.3536i |
| | 0.3536 | 0.3536 |
| | −0.2500 + 0.2500i | 0.0000 + 0.3536i |
| | −0.0000 − 0.3536i | −0.3536 + 0.0000i |
| | 0.2500 + 0.2500i | −0.0000 − 0.3536i |
| c11 = | 0.3536 | −0.3536 |
| | −0.2500 − 0.2500i | 0.3536 − 0.0000i |
| | 0.0000 + 0.3536i | −0.3536 + 0.0000i |
| | 0.2500 − 0.2500i | 0.3536 − 0.0000i |
| | 0.3536 | 0.3536 |
| | −0.2500 − 0.2500i | −0.3536 + 0.0000i |
| | 0.0000 + 0.3536i | 0.3536 − 0.0000i |
| | 0.2500 − 0.2500i | −0.3536 + 0.0000i |
| c12 = | 0.3536 | −0.3536 |
| | 0.2500 − 0.2500i | 0.0000 + 0.3536i |
| | −0.0000 − 0.3536i | 0.3536 − 0.0000i |
| | −0.2500 − 0.2500i | −0.0000 − 0.3536i |
| | 0.3536 | 0.3536 |
| | 0.2500 − 0.2500i | −0.0000 − 0.3536i |
| | −0.0000 − 0.3536i | −0.3536 + 0.0000i |
| | −0.2500 − 0.2500i | 0.0000 + 0.3536i |
| c13 = | 0.3536 | −0.3536 |
| | 0.2500 + 0.2500i | −0.2500 − 0.2500i |
| | 0.0000 + 0.3536i | −0.0000 − 0.3536i |
| | −0.2500 + 0.2500i | 0.2500 − 0.2500i |
| | 0.3536 | 0.3536 |
| | 0.2500 + 0.2500i | 0.2500 + 0.2500i |
| | 0.0000 + 0.3536i | 0.0000 + 0.3536i |
| | −0.2500 + 0.2500i | −0.2500 + 0.2500i |

-continued

| | | |
|---|---|---|
| c14 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c15 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c16 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |

In another general aspect, there is provided a transmitter for a MIMO communication system, the transmitter comprising a memory configured to store a codebook comprising at least one of 8×2 codeword matrices c1, c2, c3, c4, c5, c6, c7, c8, c9, c10, c11, c12, c13, c14, c15, and c16, and a precoder configured to precode a data stream to be transmitted based on the codebook, wherein the codeword matrices c1, c2, c3, c4, c5, c6, c7, c8, c9, c10, c11, c12, c13, c14, c15, and c16 are represented by the following Table:

| | | |
|---|---|---|
| c1 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c2 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c3 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c4 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c5 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |

-continued

| | | |
|---|---|---|
| c6 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c7 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | −0.3536 | 0.3536 |
| | −0.0000 − 0.3536i | −0.2500 + 0.2500i |
| | 0.3536 − 0.0000i | −0.0000 − 0.3536i |
| | 0.0000 + 0.3536i | 0.2500 + 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c10 = | −0.3536 | 0.3536 |
| | 0.0000 + 0.3536i | 0.2500 − 0.2500i |
| | 0.3536 − 0.0000i | −0.0000 − 0.3536i |
| | −0.0000 − 0.3536i | −0.2500 − 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c11 = | 0.3536 | −0.3536 |
| | 0.3536 | 0.2500 + 0.2500i |
| | 0.3536 | −0.0000 − 0.3536i |
| | 0.3536 | −0.2500 + 0.2500i |
| | 0.3536 | 0.3536 |
| | 0.3536 | −0.2500 − 0.2500i |
| | 0.3536 | 0.0000 + 0.3536i |
| | 0.3536 | 0.2500 − 0.2500i |
| c12 = | 0.3536 | −0.3536 |
| | −0.2500 − 0.2500i | −0.2500 − 0.2500i |
| | 0.0000 + 0.3536i | −0.0000 − 0.3536i |
| | 0.2500 − 0.2500i | 0.2500 − 0.2500i |
| | 0.3536 | 0.3536 |
| | −0.2500 − 0.2500i | 0.2500 + 0.2500i |
| | 0.0000 + 0.3536i | 0.0000 + 0.3536i |
| | 0.2500 − 0.2500i | −0.2500 + 0.2500i |
| c13 = | 0.3536 + 0.0000i | 0.3536 + 0.0000i |
| | 0.2500 − 0.2500i | 0.2500 + 0.2500i |
| | 0.2500 − 0.2500i | −0.2500 + 0.2500i |
| | 0.0000 − 0.3536i | −0.3536 − 0.0000i |
| | 0.0000 − 0.3536i | 0.0000 − 0.3536i |
| | −0.2500 − 0.2500i | 0.2500 − 0.2500i |
| | −0.2500 − 0.2500i | 0.2500 + 0.2500i |
| | −0.3536 − 0.0000i | −0.0000 + 0.3536i |
| c14 = | 0.3536 + 0.0000i | 0.3536 + 0.0000i |
| | 0.2500 − 0.2500i | 0.3536 + 0.0000i |
| | 0.2500 − 0.2500i | 0.2500 + 0.2500i |
| | 0.0000 − 0.3536i | 0.2500 + 0.2500i |
| | 0.0000 − 0.3536i | −0.0000 + 0.3536i |
| | −0.2500 − 0.2500i | −0.0000 + 0.3536i |
| | −0.2500 − 0.2500i | −0.2500 + 0.2500i |
| | −0.3536 − 0.0000i | −0.2500 + 0.2500i |
| c15 = | 0.3536 + 0.0000i | 0.3536 + 0.0000i |
| | 0.0000 − 0.3536i | 0.2500 + 0.2500i |
| | −0.2500 − 0.2500i | −0.2500 + 0.2500i |
| | −0.2500 + 0.2500i | −0.3536 − 0.0000i |
| | −0.0000 + 0.3536i | 0.0000 − 0.3536i |
| | 0.3536 + 0.0000i | 0.2500 − 0.2500i |

-continued

| | | |
|---|---|---|
| | 0.2500 − 0.2500i | 0.2500 + 0.2500i |
| | −0.2500 − 0.2500i | −0.0000 + 0.3536i |
| c16 = | 0.3536 + 0.0000i | 0.3536 + 0.0000i |
| | 0.0000 − 0.3536i | 0.3536 + 0.0000i |
| | −0.2500 − 0.2500i | 0.2500 + 0.2500i |
| | −0.2500 + 0.2500i | 0.2500 + 0.2500i |
| | −0.0000 + 0.3536i | −0.0000 + 0.3536i |
| | 0.3536 + 0.0000i | −0.0000 + 0.3536i |
| | 0.2500 − 0.2500i | −0.2500 + 0.2500i |
| | −0.2500 − 0.2500i | −0.2500 + 0.2500i |

In another general aspect, there is provided a receiver for a MIMO communication system, the receiver comprising a memory configured to store a codebook comprising at least one of 8×1 codeword matrices c1, c2, c3, c4, c5, c6, c7, c8, c9, c10, c11, c12, c13, c14, c15, and c16, and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3 , c4, c5, c6, c7, c8, c9, c10, c11, c12 , c13, c14, c15, and c16 are represented by the following Table:

| | |
|---|---|
| c1 = | 0.5000 |
| | 0.5000 |
| | 0.5000 |
| | 0.5000 |
| | 0 |
| | 0 |
| | 0 |
| | 0 |
| c2 = | 0.5000 |
| | 0.0000 + 0.5000i |
| | −0.5000 + 0.0000i |
| | −0.0000 − 0.5000i |
| | 0 |
| | 0 |
| | 0 |
| | 0 |
| c3 = | 0.5000 |
| | −0.5000 + 0.0000i |
| | 0.5000 − 0.0000i |
| | −0.5000 + 0.0000i |
| | 0 |
| | 0 |
| | 0 |
| | 0 |
| c4 = | 0.5000 |
| | −0.0000 − 0.5000i |
| | −0.5000 + 0.0000i |
| | 0.0000 + 0.5000i |
| | 0 |
| | 0 |
| | 0 |
| | 0 |
| c5 = | 0.5000 |
| | 0.3536 + 0.3536i |
| | 0.0000 + 0.5000i |
| | −0.3536 + 0.3536i |
| | 0 |
| | 0 |
| | 0 |
| | 0 |
| c6 = | 0.5000 |
| | −0.3536 + 0.3536i |
| | −0.0000 − 0.5000i |
| | 0.3536 + 0.3536i |
| | 0 |
| | 0 |
| | 0 |
| | 0 |
| c7 = | 0.5000 |
| | −0.3536 − 0.3536i |
| | 0.0000 + 0.5000i |
| | 0.3536 − 0.3536i |
| | 0 |
| | 0 |
| | 0 |
| | 0 |
| c8 = | 0.5000 |
| | 0.3536 − 0.3536i |
| | −0.0000 − 0.5000i |
| | −0.3536 − 0.3536i |
| | 0 |
| | 0 |
| | 0 |
| | 0 |
| c9 = | 0 |
| | 0 |
| | 0 |
| | 0 |
| | 0.5000 |
| | 0.5000 |
| | 0.5000 |
| | 0.5000 |
| c10 = | 0 |
| | 0 |
| | 0 |
| | 0 |
| | 0.5000 |
| | 0.0000 + 0.5000i |
| | −0.5000 + 0.0000i |
| | −0.0000 − 0.5000i |
| c11 = | 0 |
| | 0 |
| | 0 |
| | 0 |
| | 0.5000 |
| | −0.5000 + 0.0000i |
| | 0.5000 − 0.0000i |
| | −0.5000 + 0.0000i |
| c12 = | 0 |
| | 0 |
| | 0 |
| | 0 |
| | 0.5000 |
| | −0.0000 − 0.5000i |
| | −0.5000 + 0.0000i |
| | 0.0000 + 0.5000i |
| c13 = | 0 |
| | 0 |
| | 0 |
| | 0 |
| | 0.5000 |
| | 0.3536 + 0.3536i |
| | 0.0000 + 0.5000i |
| | −0.3536 + 0.3536i |
| c14 = | 0 |
| | 0 |
| | 0 |
| | 0 |
| | 0.5000 |
| | −0.3536 + 0.3536i |
| | −0.0000 − 0.5000i |
| | 0.3536 + 0.3536i |
| c15 = | 0 |
| | 0 |
| | 0 |
| | 0 |
| | 0.5000 |
| | −0.3536 − 0.3536i |
| | 0.0000 + 0.5000i |
| | 0.3536 − 0.3536i |
| c16 = | 0 |
| | 0 |
| | 0 |
| | 0 |
| | 0.5000 |
| | 0.3536 − 0.3536i |
| | −0.0000 − 0.5000i |
| | −0.3536 − 0.3536i |

In another general aspect, there is provided a receiver for a MIMO communication system, the receiver comprising a memory configured to store a codebook comprising at least one of 8×1 codeword matrices c1, c2, c3, c4, c5, c6, c7, c8, c9, c10, c11, c12, c13, c14, c15, and c16, and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are represented by the following Table:

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.3536 + 0.0000i |
| | 0.3536 − 0.0000i |
| | −0.3536 + 0.0000i |
| | 0.3536 |
| | −0.3536 + 0.0000i |
| | 0.3536 − 0.0000i |
| | −0.3536 + 0.0000i |
| c4 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c5 = | −0.3536 |
| | −0.3536 |
| | −0.3536 |
| | −0.3536 |
| | 0.3536 |
| | 0.3536 |
| | 0.3536 |
| | 0.3536 |
| c6 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c7 = | −0.3536 |
| | 0.3536 − 0.0000i |
| | −0.3536 + 0.0000i |
| | 0.3536 − 0.0000i |
| | 0.3536 |
| | −0.3536 + 0.0000i |
| | 0.3536 − 0.0000i |
| | −0.3536 + 0.0000i |
| c8 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c9 = | 0.3536 |
| | 0.2500 + 0.2500i |
| | 0.0000 + 0.3536i |
| | −0.2500 + 0.2500i |

-continued

| | |
|---|---|
| | 0.3536 |
| | 0.2500 + 0.2500i |
| | 0.0000 + 0.3536i |
| | −0.2500 + 0.2500i |
| c10 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c11 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c12 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c13 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c14 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c15 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c16 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |

In another general aspect, there is provided a receiver for a MIMO communication system, the receiver comprising a memory configured to store a codebook comprising at least one of 8×1 codeword matrices c1, c2, c3, c4, c5, c6, c7, c8, c9, c10, c11, c12, c13, c14, c15, and c16, and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are represented by the following Table:

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c4 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c5 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c6 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c7 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c8 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c9 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c10 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |

-continued

| | |
|---|---|
| c11 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c12 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |
| c13 = | 0.3536 + 0.0000i |
| | 0.2500 − 0.2500i |
| | 0.2500 − 0.2500i |
| | 0.0000 − 0.3536i |
| | 0.0000 − 0.3536i |
| | −0.2500 − 0.2500i |
| | −0.2500 − 0.2500i |
| | −0.3536 − 0.0000i |
| c14 = | 0.3536 + 0.0000i |
| | 0.0000 − 0.3536i |
| | −0.2500 − 0.2500i |
| | −0.2500 + 0.2500i |
| | −0.0000 + 0.3536i |
| | 0.3536 + 0.0000i |
| | 0.2500 − 0.2500i |
| | −0.2500 − 0.2500i |
| c15 = | 0.3536 + 0.0000i |
| | 0.2500 + 0.2500i |
| | −0.2500 + 0.2500i |
| | −0.3536 − 0.0000i |
| | 0.0000 − 0.3536i |
| | 0.2500 − 0.2500i |
| | 0.2500 + 0.2500i |
| | −0.0000 + 0.3536i |
| c16 = | 0.3536 + 0.0000i |
| | 0.3536 + 0.0000i |
| | 0.2500 + 0.2500i |
| | 0.2500 + 0.2500i |
| | −0.0000 + 0.3536i |
| | −0.0000 + 0.3536i |
| | −0.2500 + 0.2500i |
| | −0.2500 + 0.2500i |

In another general aspect, there is provided a receiver for a MIMO communication system, the receiver comprising a memory configured to store a codebook comprising at least one of 8×2 codeword matrices c1, c2, c3, c4, c5, c6, c7, c8, c9, c10, c11, c12, c13, c14, c15, and c16, and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are represented by the following Table:

| | | |
|---|---|---|
| c1 = | 0.3536 | −0.3536 |
| | 0.3536 | −0.3536 |
| | 0.3536 | −0.3536 |
| | 0.3536 | −0.3536 |
| | 0.3536 | 0.3536 |
| | 0.3536 | 0.3536 |
| | 0.3536 | 0.3536 |
| | 0.3536 | 0.3536 |
| c2 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |

-continued

| | | |
|---|---|---|
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c3 = | 0.3536 | −0.3536 |
| | −0.3536 + 0.0000i | 0.3536 − 0.0000i |
| | 0.3536 − 0.0000i | −0.3536 + 0.0000i |
| | −0.3536 + 0.0000i | 0.3536 − 0.0000i |
| | 0.3536 | 0.3536 |
| | −0.3536 + 0.0000i | −0.3536 + 0.0000i |
| | 0.3536 − 0.0000i | 0.3536 − 0.0000i |
| | −0.3536 + 0.0000i | −0.3536 + 0.0000i |
| c4 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c5 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c6 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c7 = | 0.3536 | −0.3536 |
| | −0.3536 + 0.0000i | 0.2500 + 0.2500i |
| | 0.3536 − 0.0000i | −0.0000 − 0.3536i |
| | −0.3536 + 0.0000i | −0.2500 + 0.2500i |
| | 0.3536 | 0.3536 |
| | −0.3536 + 0.0000i | −0.2500 − 0.2500i |
| | 0.3536 − 0.0000i | 0.0000 + 0.3536i |
| | −0.3536 + 0.0000i | 0.2500 − 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | 0.3536 | −0.3536 |
| | 0.2500 + 0.2500i | −0.3536 |
| | 0.0000 + 0.3536i | −0.3536 |
| | −0.2500 + 0.2500i | −0.3536 |
| | 0.3536 | 0.3536 |
| | 0.2500 + 0.2500i | 0.3536 |
| | 0.0000 + 0.3536i | 0.3536 |
| | −0.2500 + 0.2500i | 0.3536 |
| c10 = | 0.3536 | −0.3536 |
| | −0.2500 + 0.2500i | −0.0000 − 0.3536i |
| | −0.0000 − 0.3536i | 0.3536 − 0.0000i |
| | 0.2500 + 0.2500i | 0.0000 + 0.3536i |
| | 0.3536 | 0.3536 |
| | −0.2500 + 0.2500i | 0.0000 + 0.3536i |
| | −0.0000 − 0.3536i | −0.3536 + 0.0000i |
| | 0.2500 + 0.2500i | −0.0000 − 0.3536i |
| c11 = | 0.3536 | −0.3536 |
| | −0.2500 − 0.2500i | 0.3536 − 0.0000i |
| | 0.0000 + 0.3536i | −0.3536 + 0.0000i |
| | 0.2500 − 0.2500i | 0.3536 − 0.0000i |
| | 0.3536 | 0.3536 |
| | −0.2500 − 0.2500i | −0.3536 + 0.0000i |
| | 0.0000 + 0.3536i | 0.3536 − 0.0000i |
| | 0.2500 − 0.2500i | −0.3536 + 0.0000i |
| c12 = | 0.3536 | −0.3536 |
| | 0.2500 − 0.2500i | 0.0000 + 0.3536i |
| | −0.0000 − 0.3536i | 0.3536 − 0.0000i |
| | −0.2500 − 0.2500i | −0.0000 − 0.3536i |

-continued

| | | |
|---|---|---|
| | 0.3536 | 0.3536 |
| | 0.2500 − 0.2500i | −0.0000 − 0.3536i |
| | −0.0000 − 0.3536i | −0.3536 + 0.0000i |
| | −0.2500 − 0.2500i | 0.0000 + 0.3536i |
| c13 = | 0.3536 | −0.3536 |
| | 0.2500 + 0.2500i | −0.2500 − 0.2500i |
| | 0.0000 + 0.3536i | −0.0000 − 0.3536i |
| | −0.2500 + 0.2500i | 0.2500 − 0.2500i |
| | 0.3536 | 0.3536 |
| | 0.2500 + 0.2500i | 0.2500 + 0.2500i |
| | 0.0000 + 0.3536i | 0.0000 + 0.3536i |
| | −0.2500 + 0.2500i | −0.2500 + 0.2500i |
| c14 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c15 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c16 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |

In another general aspect, there is provided a receiver for a MIMO communication system, the receiver comprising a memory configured to store a codebook comprising at least one of 8×2 codeword matrices c1, c2, c3, c4, c5, c6, c7, c8, c9, c10, c11, c12, c13, c14, c15, and c16, and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are represented by the following Table:

| | | |
|---|---|---|
| c1 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c2 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c3 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |

-continued

| | | |
|---|---|---|
| c4 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c5 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |
| c6 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c7 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | −0.3536 | 0.3536 |
| | −0.0000 − 0.3536i | −0.2500 + 0.2500i |
| | 0.3536 − 0.0000i | −0.0000 − 0.3536i |
| | 0.0000 + 0.3536i | 0.2500 + 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c10 = | −0.3536 | 0.3536 |
| | 0.0000 + 0.3536i | 0.2500 − 0.2500i |
| | 0.3536 − 0.0000i | −0.0000 − 0.3536i |
| | −0.0000 − 0.3536i | −0.2500 − 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c11 = | 0.3536 | −0.3536 |
| | 0.3536 | 0.2500 + 0.2500i |
| | 0.3536 | −0.0000 − 0.3536i |
| | 0.3536 | −0.2500 + 0.2500i |
| | 0.3536 | 0.3536 |
| | 0.3536 | −0.2500 − 0.2500i |
| | 0.3536 | 0.0000 + 0.3536i |
| | 0.3536 | 0.2500 − 0.2500i |
| c12 = | 0.3536 | −0.3536 |
| | −0.2500 − 0.2500i | −0.2500 − 0.2500i |
| | 0.0000 + 0.3536i | −0.0000 − 0.3536i |
| | 0.2500 − 0.2500i | 0.2500 − 0.2500i |
| | 0.3536 | 0.3536 |
| | −0.2500 − 0.2500i | 0.2500 + 0.2500i |
| | 0.0000 + 0.3536i | 0.0000 + 0.3536i |
| | 0.2500 − 0.2500i | −0.2500 + 0.2500i |
| c13 = | 0.3536 + 0.0000i | 0.3536 + 0.0000i |
| | 0.2500 − 0.2500i | 0.2500 + 0.2500i |
| | 0.2500 − 0.2500i | −0.2500 + 0.2500i |
| | 0.0000 − 0.3536i | −0.3536 − 0.0000i |
| | 0.0000 − 0.3536i | 0.0000 − 0.3536i |
| | −0.2500 − 0.2500i | 0.2500 − 0.2500i |

-continued

| | | |
|---|---|---|
| | −0.2500 − 0.2500i | 0.2500 + 0.2500i |
| | −0.3536 − 0.0000i | −0.0000 + 0.3536i |
| c14 = | 0.3536 + 0.0000i | 0.3536 + 0.0000i |
| | 0.2500 − 0.2500i | 0.3536 + 0.0000i |
| | 0.2500 − 0.2500i | 0.2500 + 0.2500i |
| | 0.0000 − 0.3536i | 0.2500 + 0.2500i |
| | 0.0000 − 0.3536i | −0.0000 + 0.3536i |
| | −0.2500 − 0.2500i | −0.0000 + 0.3536i |
| | −0.2500 − 0.2500i | −0.2500 + 0.2500i |
| | −0.3536 − 0.0000i | −0.2500 + 0.2500i |
| c15 = | 0.3536 + 0.0000i | 0.3536 + 0.0000i |
| | 0.0000 − 0.3536i | 0.2500 + 0.2500i |
| | −0.2500 − 0.2500i | −0.2500 + 0.2500i |
| | −0.2500 + 0.2500i | −0.3536 − 0.0000i |
| | −0.0000 + 0.3536i | 0.0000 − 0.3536i |
| | 0.3536 + 0.0000i | 0.2500 − 0.2500i |
| | 0.2500 − 0.2500i | 0.2500 + 0.2500i |
| | −0.2500 − 0.2500i | −0.0000 + 0.3536i |
| c16 = | 0.3536 + 0.0000i | 0.3536 + 0.0000i |
| | 0.0000 − 0.3536i | 0.3536 + 0.0000i |
| | −0.2500 − 0.2500i | 0.2500 + 0.2500i |
| | −0.2500 + 0.2500i | 0.2500 + 0.2500i |
| | −0.0000 + 0.3536i | −0.0000 + 0.3536i |
| | 0.3536 + 0.0000i | −0.0000 + 0.3536i |
| | 0.2500 − 0.2500i | −0.2500 + 0.2500i |
| | −0.2500 − 0.2500i | −0.2500 + 0.2500i |

In another general aspect, there is provided a precoding method of a transmitter for a MIMO communication system, the method comprising accessing a memory storing a codebook comprising at least one of codeword matrices c1, c2, c3, c4, c5, c6, c7, c8, c9, c10, c11, c12, c13, c14, c15, and c16, and precoding a data stream to be transmitted based on the codebook, wherein the codeword matrices c1, c2, c3, c4, c5, c6, c7, c8, c9, c10, c11, c12, c13, c14, c15, and c16 are represented by at least one of the following Table 1 to Table 5:

TABLE 1

| | |
|---|---|
| c1 = | 0.5000 |
| | 0.5000 |
| | 0.5000 |
| | 0.5000 |
| | 0 |
| | 0 |
| | 0 |
| | 0 |
| c2 = | 0.5000 |
| | 0.0000 + 0.5000i |
| | −0.5000 + 0.0000i |
| | −0.0000 − 0.5000i |
| | 0 |
| | 0 |
| | 0 |
| | 0 |
| c3 = | 0.5000 |
| | −0.5000 + 0.0000i |
| | 0.5000 − 0.0000i |
| | −0.5000 + 0.0000i |
| | 0 |
| | 0 |
| | 0 |
| | 0 |
| c4 = | 0.5000 |
| | −0.0000 − 0.5000i |
| | −0.5000 + 0.0000i |
| | 0.0000 + 0.5000i |
| | 0 |
| | 0 |
| | 0 |
| | 0 |
| c5 = | 0.5000 |
| | 0.3536 + 0.3536i |
| | 0.0000 + 0.5000i |
| | −0.3536 + 0.3536i |
| | 0 |

TABLE 1-continued

| | |
|---|---|
| | 0 |
| | 0 |
| | 0 |
| c6 = | 0.5000 |
| | −0.3536 + 0.3536i |
| | −0.0000 − 0.5000i |
| | 0.3536 + 0.3536i |
| | 0 |
| | 0 |
| | 0 |
| | 0 |
| c7 = | 0.5000 |
| | −0.3536 − 0.3536i |
| | 0.0000 + 0.5000i |
| | 0.3536 − 0.3536i |
| | 0 |
| | 0 |
| | 0 |
| | 0 |
| c8 = | 0.5000 |
| | 0.3536 − 0.3536i |
| | −0.0000 − 0.5000i |
| | −0.3536 − 0.3536i |
| | 0 |
| | 0 |
| | 0 |
| | 0 |
| c9 = | 0 |
| | 0 |
| | 0 |
| | 0 |
| | 0.5000 |
| | 0.5000 |
| | 0.5000 |
| | 0.5000 |
| c10 = | 0 |
| | 0 |
| | 0 |
| | 0 |
| | 0.5000 |
| | 0.0000 + 0.5000i |
| | −0.5000 + 0.0000i |
| | −0.0000 − 0.5000i |
| c11 = | 0 |
| | 0 |
| | 0 |
| | 0 |
| | 0.5000 |
| | −0.5000 + 0.0000i |
| | 0.5000 − 0.0000i |
| | −0.5000 + 0.0000i |
| c12 = | 0 |
| | 0 |
| | 0 |
| | 0 |
| | 0.5000 |
| | −0.0000 − 0.5000i |
| | −0.5000 + 0.0000i |
| | 0.0000 + 0.5000i |
| c13 = | 0 |
| | 0 |
| | 0 |
| | 0 |
| | 0.5000 |
| | 0.3536 + 0.3536i |
| | 0.0000 + 0.5000i |
| | −0.3536 + 0.3536i |
| c14 = | 0 |
| | 0 |
| | 0 |
| | 0 |
| | 0.5000 |
| | −0.3536 + 0.3536i |
| | −0.0000 − 0.5000i |
| | 0.3536 + 0.3536i |
| c15 = | 0 |
| | 0 |
| | 0 |
| | 0 |
| | 0.5000 |

TABLE 1-continued

| | |
|---|---|
| | −0.3536 − 0.3536i |
| | 0.0000 + 0.5000i |
| | 0.3536 − 0.3536i |
| c16 = | 0 |
| | 0 |
| | 0 |
| | 0 |
| | 0.5000 |
| | 0.3536 − 0.3536i |
| | −0.0000 − 0.5000i |
| | −0.3536 − 0.3536i |

TABLE 2

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.3536 + 0.0000i |
| | 0.3536 − 0.0000i |
| | −0.3536 + 0.0000i |
| | 0.3536 |
| | −0.3536 + 0.0000i |
| | 0.3536 − 0.0000i |
| | −0.3536 + 0.0000i |
| c4 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c5 = | −0.3536 |
| | −0.3536 |
| | −0.3536 |
| | −0.3536 |
| | 0.3536 |
| | 0.3536 |
| | 0.3536 |
| | 0.3536 |
| c6 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c7 = | −0.3536 |
| | 0.3536 − 0.0000i |
| | −0.3536 + 0.0000i |
| | 0.3536 − 0.0000i |
| | 0.3536 |
| | −0.3536 + 0.0000i |
| | 0.3536 − 0.0000i |
| | −0.3536 + 0.0000i |
| c8 = | −0.3536 |
| | 0.0000 + 0.3536i |
| | 0.3536 − 0.0000i |
| | −0.0000 − 0.3536i |
| | 0.3536 |
| | −0.0000 − 0.3536i |

TABLE 2-continued

| | |
|---|---|
| | −0.3536 + 0.0000i |
| | 0.0000 + 0.3536i |
| c9 = | 0.3536 |
| | 0.2500 + 0.2500i |
| | 0.0000 + 0.3536i |
| | −0.2500 + 0.2500i |
| | 0.3536 |
| | 0.2500 + 0.2500i |
| | 0.0000 + 0.3536i |
| | −0.2500 + 0.2500i |
| c10 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c11 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c12 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c13 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c14 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c15 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c16 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |

TABLE 3

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |

TABLE 3-continued

| | |
|---|---|
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c4 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c5 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c6 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c7 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c8 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c9 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c10 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c11 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |

TABLE 3-continued

| | |
|---|---|
| c12 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |
| c13 = | 0.3536 + 0.0000i |
| | 0.2500 − 0.2500i |
| | 0.2500 − 0.2500i |
| | 0.0000 − 0.3536i |
| | 0.0000 − 0.3536i |
| | −0.2500 − 0.2500i |
| | −0.2500 − 0.2500i |
| | −0.3536 − 0.0000i |
| c14 = | 0.3536 + 0.0000i |
| | 0.0000 − 0.3536i |
| | −0.2500 − 0.2500i |
| | −0.2500 + 0.2500i |
| | −0.0000 + 0.3536i |
| | 0.3536 + 0.0000i |
| | 0.2500 − 0.2500i |
| | −0.2500 − 0.2500i |
| c15 = | 0.3536 + 0.0000i |
| | 0.2500 + 0.2500i |
| | −0.2500 + 0.2500i |
| | −0.3536 − 0.0000i |
| | 0.0000 − 0.3536i |
| | 0.2500 − 0.2500i |
| | 0.2500 + 0.2500i |
| | −0.0000 + 0.3536i |
| c16 = | 0.3536 + 0.0000i |
| | 0.3536 + 0.0000i |
| | 0.2500 + 0.2500i |
| | 0.2500 + 0.2500i |
| | −0.0000 + 0.3536i |
| | −0.0000 + 0.3536i |
| | −0.2500 + 0.2500i |
| | −0.2500 + 0.2500i |

TABLE 4

| | | |
|---|---|---|
| c1 = | 0.3536 | −0.3536 |
| | 0.3536 | −0.3536 |
| | 0.3536 | −0.3536 |
| | 0.3536 | −0.3536 |
| | 0.3536 | 0.3536 |
| | 0.3536 | 0.3536 |
| | 0.3536 | 0.3536 |
| | 0.3536 | 0.3536 |
| c2 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c3 = | 0.3536 | −0.3536 |
| | −0.3536 + 0.0000i | 0.3536 − 0.0000i |
| | 0.3536 − 0.0000i | −0.3536 + 0.0000i |
| | −0.3536 + 0.0000i | 0.3536 − 0.0000i |
| | 0.3536 | 0.3536 |
| | −0.3536 + 0.0000i | −0.3536 + 0.0000i |
| | 0.3536 − 0.0000i | 0.3536 − 0.0000i |
| | −0.3536 + 0.0000i | −0.3536 + 0.0000i |
| c4 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c5 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c6 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c7 = | 0.3536 | −0.3536 |
| | −0.3536 + 0.0000i | 0.2500 + 0.2500i |
| | 0.3536 − 0.0000i | −0.0000 − 0.3536i |
| | −0.3536 + 0.0000i | −0.2500 + 0.2500i |
| | 0.3536 | 0.3536 |
| | −0.3536 + 0.0000i | −0.2500 − 0.2500i |
| | 0.3536 − 0.0000i | 0.0000 + 0.3536i |
| | −0.3536 + 0.0000i | 0.2500 − 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | 0.3536 | −0.3536 |
| | 0.2500 + 0.2500i | −0.3536 |
| | 0.0000 + 0.3536i | −0.3536 |
| | −0.2500 + 0.2500i | −0.3536 |
| | 0.3536 | 0.3536 |
| | 0.2500 + 0.2500i | 0.3536 |
| | 0.0000 + 0.3536i | 0.3536 |
| | −0.2500 + 0.2500i | 0.3536 |
| c10 = | 0.3536 | −0.3536 |
| | −0.2500 + 0.2500i | −0.0000 − 0.3536i |
| | −0.0000 − 0.3536i | 0.3536 − 0.0000i |
| | 0.2500 + 0.2500i | 0.0000 + 0.3536i |
| | 0.3536 | 0.3536 |
| | −0.2500 + 0.2500i | 0.0000 + 0.3536i |
| | −0.0000 − 0.3536i | −0.3536 + 0.0000i |
| | 0.2500 + 0.2500i | −0.0000 − 0.3536i |
| c11 = | 0.3536 | −0.3536 |
| | −0.2500 − 0.2500i | 0.3536 − 0.0000i |
| | 0.0000 + 0.3536i | −0.3536 + 0.0000i |
| | 0.2500 − 0.2500i | 0.3536 − 0.0000i |
| | 0.3536 | 0.3536 |
| | −0.2500 − 0.2500i | −0.3536 + 0.0000i |
| | 0.0000 + 0.3536i | 0.3536 − 0.0000i |
| | 0.2500 − 0.2500i | −0.3536 + 0.0000i |
| c12 = | 0.3536 | −0.3536 |
| | 0.2500 − 0.2500i | 0.0000 + 0.3536i |
| | −0.0000 − 0.3536i | 0.3536 − 0.0000i |
| | −0.2500 − 0.2500i | −0.0000 − 0.3536i |
| | 0.3536 | 0.3536 |
| | 0.2500 − 0.2500i | −0.0000 − 0.3536i |
| | −0.0000 − 0.3536i | −0.3536 + 0.0000i |
| | −0.2500 − 0.2500i | 0.0000 + 0.3536i |
| c13 = | 0.3536 | −0.3536 |
| | 0.2500 + 0.2500i | −0.2500 − 0.2500i |
| | 0.0000 + 0.3536i | −0.0000 − 0.3536i |
| | −0.2500 + 0.2500i | 0.2500 − 0.2500i |
| | 0.3536 | 0.3536 |
| | 0.2500 + 0.2500i | 0.2500 + 0.2500i |
| | 0.0000 + 0.3536i | 0.0000 + 0.3536i |
| | −0.2500 + 0.2500i | −0.2500 + 0.2500i |
| c14 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c15 = | 0.3536 | −0.3536 |
| | −0.2500 − 0.2500i | 0.2500 + 0.2500i |

TABLE 4-continued

| | | |
|---|---|---|
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c16 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |

TABLE 5

| | | |
|---|---|---|
| c1 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c2 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c3 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c4 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c5 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |
| c6 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c7 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |

TABLE 5-continued

| | | |
|---|---|---|
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | −0.3536 | 0.3536 |
| | −0.0000 − 0.3536i | −0.2500 + 0.2500i |
| | 0.3536 − 0.0000i | −0.0000 − 0.3536i |
| | 0.0000 + 0.3536i | 0.2500 + 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c10 = | −0.3536 | 0.3536 |
| | 0.0000 + 0.3536i | 0.2500 − 0.2500i |
| | 0.3536 − 0.0000i | −0.0000 − 0.3536i |
| | −0.0000 − 0.3536i | −0.2500 − 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c11 = | 0.3536 | −0.3536 |
| | 0.3536 | 0.2500 + 0.2500i |
| | 0.3536 | −0.0000 − 0.3536i |
| | 0.3536 | −0.2500 + 0.2500i |
| | 0.3536 | 0.3536 |
| | 0.3536 | −0.2500 − 0.2500i |
| | 0.3536 | 0.0000 + 0.3536i |
| | 0.3536 | 0.2500 − 0.2500i |
| c12 = | 0.3536 | −0.3536 |
| | −0.2500 − 0.2500i | −0.2500 − 0.2500i |
| | 0.0000 + 0.3536i | −0.0000 − 0.3536i |
| | 0.2500 − 0.2500i | 0.2500 − 0.2500i |
| | 0.3536 | 0.3536 |
| | −0.2500 − 0.2500i | 0.2500 + 0.2500i |
| | 0.0000 + 0.3536i | 0.0000 + 0.3536i |
| | 0.2500 − 0.2500i | −0.2500 + 0.2500i |
| c13 = | 0.3536 + 0.0000i | 0.3536 + 0.0000i |
| | 0.2500 − 0.2500i | 0.2500 + 0.2500i |
| | 0.2500 − 0.2500i | −0.2500 + 0.2500i |
| | 0.0000 − 0.3536i | −0.3536 − 0.0000i |
| | 0.0000 − 0.3536i | 0.0000 − 0.3536i |
| | −0.2500 − 0.2500i | 0.2500 − 0.2500i |
| | −0.2500 − 0.2500i | 0.2500 + 0.2500i |
| | −0.3536 − 0.0000i | −0.0000 + 0.3536i |
| c14 = | 0.3536 + 0.0000i | 0.3536 + 0.0000i |
| | 0.2500 − 0.2500i | 0.3536 + 0.0000i |
| | 0.2500 − 0.2500i | 0.2500 + 0.2500i |
| | 0.0000 − 0.3536i | 0.2500 + 0.2500i |
| | 0.0000 − 0.3536i | −0.0000 + 0.3536i |
| | −0.2500 − 0.2500i | −0.0000 + 0.3536i |
| | −0.2500 − 0.2500i | −0.2500 + 0.2500i |
| | −0.3536 − 0.0000i | −0.2500 + 0.2500i |
| c15 = | 0.3536 + 0.0000i | 0.3536 + 0.0000i |
| | 0.0000 − 0.3536i | 0.2500 + 0.2500i |
| | −0.2500 − 0.2500i | −0.2500 + 0.2500i |
| | −0.2500 + 0.2500i | −0.3536 − 0.0000i |
| | −0.0000 + 0.3536i | 0.0000 − 0.3536i |
| | 0.3536 + 0.0000i | 0.2500 − 0.2500i |
| | 0.2500 − 0.2500i | 0.2500 + 0.2500i |
| | −0.2500 − 0.2500i | −0.0000 + 0.3536i |
| c16 = | 0.3536 + 0.0000i | 0.3536 + 0.0000i |
| | 0.0000 − 0.3536i | 0.3536 + 0.0000i |
| | −0.2500 − 0.2500i | 0.2500 + 0.2500i |
| | −0.2500 + 0.2500i | 0.2500 + 0.2500i |
| | −0.0000 + 0.3536i | −0.0000 + 0.3536i |
| | 0.3536 + 0.0000i | −0.0000 + 0.3536i |
| | 0.2500 − 0.2500i | −0.2500 + 0.2500i |
| | −0.2500 − 0.2500i | −0.2500 + 0.2500i |

In another general aspect, there is provided a precoding method of a receiver for a MIMO communication system, the method comprising accessing a memory storing a codebook comprising at least one of codeword matrices c1, c2, c3, c4, c5, c6, c7, c8, c9, c10, c11, c12, c13, c14, c15, and c16, and providing, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are represented by at least one of the following Table 1 to Table 5:

TABLE 1

| | |
|---|---|
| c1 = | 0.5000 |
| | 0.5000 |
| | 0.5000 |
| | 0.5000 |
| | 0 |
| | 0 |
| | 0 |
| | 0 |
| c2 = | 0.5000 |
| | 0.0000 + 0.5000i |
| | −0.5000 + 0.0000i |
| | −0.0000 − 0.5000i |
| | 0 |
| | 0 |
| | 0 |
| | 0 |
| c3 = | 0.5000 |
| | −0.5000 + 0.0000i |
| | 0.5000 − 0.0000i |
| | −0.5000 + 0.0000i |
| | 0 |
| | 0 |
| | 0 |
| | 0 |
| c4 = | 0.5000 |
| | −0.0000 − 0.5000i |
| | −0.5000 + 0.0000i |
| | 0.0000 + 0.5000i |
| | 0 |
| | 0 |
| | 0 |
| | 0 |
| c5 = | 0.5000 |
| | 0.3536 + 0.3536i |
| | 0.0000 + 0.5000i |
| | −0.3536 + 0.3536i |
| | 0 |
| | 0 |
| | 0 |
| | 0 |
| c6 = | 0.5000 |
| | −0.3536 + 0.3536i |
| | −0.0000 − 0.5000i |
| | 0.3536 + 0.3536i |
| | 0 |
| | 0 |
| | 0 |
| | 0 |
| c7 = | 0.5000 |
| | −0.3536 − 0.3536i |
| | 0.0000 + 0.5000i |
| | 0.3536 − 0.3536i |
| | 0 |
| | 0 |
| | 0 |
| | 0 |
| c8 = | 0.5000 |
| | 0.3536 − 0.3536i |
| | −0.0000 − 0.5000i |
| | −0.3536 − 0.3536i |
| | 0 |
| | 0 |
| | 0 |
| | 0 |
| c9 = | 0 |
| | 0 |
| | 0 |
| | 0 |
| | 0.5000 |
| | 0.5000 |
| | 0.5000 |
| | 0.5000 |
| c10 = | 0 |
| | 0 |
| | 0 |
| | 0 |
| | 0.5000 |
| | 0.0000 + 0.5000i |
| | −0.5000 + 0.0000i |
| | −0.0000 − 0.5000i |
| c11 = | 0 |
| | 0 |
| | 0 |
| | 0 |
| | 0.5000 |
| | −0.5000 + 0.0000i |
| | 0.5000 − 0.0000i |
| | −0.5000 + 0.0000i |
| c12 = | 0 |
| | 0 |
| | 0 |
| | 0 |
| | 0.5000 |
| | −0.0000 − 0.5000i |
| | −0.5000 + 0.0000i |
| | 0.0000 + 0.5000i |
| c13 = | 0 |
| | 0 |
| | 0 |
| | 0 |
| | 0.5000 |
| | 0.3536 + 0.3536i |
| | 0.0000 + 0.5000i |
| | −0.3536 + 0.3536i |
| c14 = | 0 |
| | 0 |
| | 0 |
| | 0 |
| | 0.5000 |
| | −0.3536 + 0.3536i |
| | −0.0000 − 0.5000i |
| | 0.3536 + 0.3536i |
| c15 = | 0 |
| | 0 |
| | 0 |
| | 0 |
| | 0.5000 |
| | −0.3536 − 0.3536i |
| | 0.0000 + 0.5000i |
| | 0.3536 − 0.3536i |
| c16 = | 0 |
| | 0 |
| | 0 |
| | 0 |
| | 0.5000 |
| | 0.3536 − 0.3536i |
| | −0.0000 − 0.5000i |
| | −0.3536 − 0.3536i |

TABLE 2

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.3536 + 0.0000i |
| | 0.3536 − 0.0000i |
| | −0.3536 + 0.0000i |
| | 0.3536 |
| | −0.3536 + 0.0000i |

TABLE 2-continued

| | |
|---|---|
| | 0.3536 − 0.0000i |
| | −0.3536 + 0.0000i |
| c4 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c5 = | −0.3536 |
| | −0.3536 |
| | −0.3536 |
| | −0.3536 |
| | 0.3536 |
| | 0.3536 |
| | 0.3536 |
| | 0.3536 |
| c6 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c7 = | −0.3536 |
| | 0.3536 − 0.0000i |
| | −0.3536 + 0.0000i |
| | 0.3536 − 0.0000i |
| | 0.3536 |
| | −0.3536 + 0.0000i |
| | 0.3536 − 0.0000i |
| | −0.3536 + 0.0000i |
| c8 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c9 = | 0.3536 |
| | 0.2500 + 0.2500i |
| | 0.0000 + 0.3536i |
| | −0.2500 + 0.2500i |
| | 0.3536 |
| | 0.2500 + 0.2500i |
| | 0.0000 + 0.3536i |
| | −0.2500 + 0.2500i |
| c10 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c11 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c12 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c13 = | −0.3536 |
| | −0.2500 − 0.2500i |
| | −0.0000 − 0.3536i |
| | 0.2500 − 0.2500i |
| | 0.3536 |
| | 0.2500 + 0.2500i |

TABLE 2-continued

| | |
|---|---|
| | 0.0000 + 0.3536i |
| | −0.2500 + 0.2500i |
| c14 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c15 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c16 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |

TABLE 3

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c4 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c5 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c6 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |

TABLE 3-continued

| | |
|---|---|
| c7 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c8 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c9 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c10 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c11 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c12 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |
| c13 = | 0.3536 + 0.0000i |
| | 0.2500 − 0.2500i |
| | 0.2500 − 0.2500i |
| | 0.0000 − 0.3536i |
| | 0.0000 − 0.3536i |
| | −0.2500 − 0.2500i |
| | −0.2500 − 0.2500i |
| | −0.3536 − 0.0000i |
| c14 = | 0.3536 + 0.0000i |
| | 0.0000 − 0.3536i |
| | −0.2500 − 0.2500i |
| | −0.2500 + 0.2500i |
| | −0.0000 + 0.3536i |
| | 0.3536 + 0.0000i |
| | 0.2500 − 0.2500i |
| | −0.2500 − 0.2500i |
| c15 = | 0.3536 + 0.0000i |
| | 0.2500 + 0.2500i |
| | −0.2500 + 0.2500i |
| | −0.3536 − 0.0000i |
| | 0.0000 − 0.3536i |
| | 0.2500 − 0.2500i |
| | 0.2500 + 0.2500i |
| | −0.0000 + 0.3536i |
| c16 = | 0.3536 + 0.0000i |
| | 0.3536 + 0.0000i |
| | 0.2500 + 0.2500i |
| | 0.2500 + 0.2500i |
| | −0.0000 + 0.3536i |
| | −0.0000 + 0.3536i |
| | −0.2500 + 0.2500i |
| | −0.2500 + 0.2500i |

TABLE 4

| | | |
|---|---|---|
| c1 = | 0.3536 | −0.3536 |
| | 0.3536 | −0.3536 |
| | 0.3536 | −0.3536 |
| | 0.3536 | −0.3536 |
| | 0.3536 | 0.3536 |
| | 0.3536 | 0.3536 |
| | 0.3536 | 0.3536 |
| | 0.3536 | 0.3536 |
| c2 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c3 = | 0.3536 | −0.3536 |
| | −0.3536 + 0.0000i | 0.3536 − 0.0000i |
| | 0.3536 − 0.0000i | −0.3536 + 0.0000i |
| | −0.3536 + 0.0000i | 0.3536 − 0.0000i |
| | 0.3536 | 0.3536 |
| | −0.3536 + 0.0000i | −0.3536 + 0.0000i |
| | 0.3536 − 0.0000i | 0.3536 − 0.0000i |
| | −0.3536 + 0.0000i | −0.3536 + 0.0000i |
| c4 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c5 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c6 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c7 = | 0.3536 | −0.3536 |
| | −0.3536 + 0.0000i | 0.2500 + 0.2500i |
| | 0.3536 − 0.0000i | −0.0000 − 0.3536i |
| | −0.3536 + 0.0000i | −0.2500 + 0.2500i |
| | 0.3536 | 0.3536 |
| | −0.3536 + 0.0000i | −0.2500 − 0.2500i |
| | 0.3536 − 0.0000i | 0.0000 + 0.3536i |
| | −0.3536 + 0.0000i | 0.2500 − 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | 0.3536 | −0.3536 |
| | 0.2500 + 0.2500i | −0.3536 |
| | 0.0000 + 0.3536i | −0.3536 |
| | −0.2500 + 0.2500i | −0.3536 |
| | 0.3536 | 0.3536 |
| | 0.2500 + 0.2500i | 0.3536 |
| | 0.0000 + 0.3536i | 0.3536 |
| | −0.2500 + 0.2500i | 0.3536 |

TABLE 4-continued

| | | |
|---|---|---|
| c10 = | 0.3536 | −0.3536 |
| | −0.2500 + 0.2500i | −0.0000 − 0.3536i |
| | −0.0000 − 0.3536i | 0.3536 − 0.0000i |
| | 0.2500 + 0.2500i | 0.0000 + 0.3536i |
| | 0.3536 | 0.3536 |
| | −0.2500 + 0.2500i | 0.0000 + 0.3536i |
| | −0.0000 − 0.3536i | −0.3536 + 0.0000i |
| | 0.2500 + 0.2500i | −0.0000 − 0.3536i |
| c11 = | 0.3536 | −0.3536 |
| | −0.2500 − 0.2500i | 0.3536 − 0.0000i |
| | 0.0000 + 0.3536i | −0.3536 + 0.0000i |
| | 0.2500 − 0.2500i | 0.3536 − 0.0000i |
| | 0.3536 | 0.3536 |
| | −0.2500 − 0.2500i | −0.3536 + 0.0000i |
| | 0.0000 + 0.3536i | 0.3536 − 0.0000i |
| | 0.2500 − 0.2500i | −0.3536 + 0.0000i |
| c12 = | 0.3536 | −0.3536 |
| | 0.2500 − 0.2500i | 0.0000 + 0.3536i |
| | −0.0000 − 0.3536i | 0.3536 − 0.0000i |
| | −0.2500 − 0.2500i | −0.0000 − 0.3536i |
| | 0.3536 | 0.3536 |
| | 0.2500 − 0.2500i | −0.0000 − 0.3536i |
| | −0.0000 − 0.3536i | −0.3536 + 0.0000i |
| | −0.2500 − 0.2500i | 0.0000 + 0.3536i |
| c13 = | 0.3536 | −0.3536 |
| | 0.2500 + 0.2500i | −0.2500 − 0.2500i |
| | 0.0000 + 0.3536i | −0.0000 − 0.3536i |
| | −0.2500 + 0.2500i | 0.2500 − 0.2500i |
| | 0.3536 | 0.3536 |
| | 0.2500 + 0.2500i | 0.2500 + 0.2500i |
| | 0.0000 + 0.3536i | 0.0000 + 0.3536i |
| | −0.2500 + 0.2500i | −0.2500 + 0.2500i |
| c14 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c15 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c16 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |

TABLE 5

| | | |
|---|---|---|
| c1 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c2 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c3 = | 0.3536 | −0.3536 |
| | −0.2500 + 0.2500i | 0.2500 − 0.2500i |

TABLE 5-continued

| | | |
|---|---|---|
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c4 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c5 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |
| c6 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c7 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | −0.3536 | 0.3536 |
| | −0.0000 − 0.3536i | −0.2500 + 0.2500i |
| | 0.3536 − 0.0000i | −0.0000 − 0.3536i |
| | 0.0000 + 0.3536i | 0.2500 + 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c10 = | −0.3536 | 0.3536 |
| | 0.0000 + 0.3536i | 0.2500 − 0.2500i |
| | 0.3536 − 0.0000i | −0.0000 − 0.3536i |
| | −0.0000 − 0.3536i | −0.2500 − 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c11 = | 0.3536 | −0.3536 |
| | 0.3536 | 0.2500 + 0.2500i |
| | 0.3536 | −0.0000 − 0.3536i |
| | 0.3536 | −0.2500 + 0.2500i |
| | 0.3536 | 0.3536 |
| | 0.3536 | −0.2500 − 0.2500i |
| | 0.3536 | 0.0000 + 0.3536i |
| | 0.3536 | 0.2500 − 0.2500i |
| c12 = | 0.3536 | −0.3536 |
| | −0.2500 − 0.2500i | −0.2500 − 0.2500i |
| | 0.0000 + 0.3536i | −0.0000 − 0.3536i |
| | 0.2500 − 0.2500i | 0.2500 − 0.2500i |
| | 0.3536 | 0.3536 |
| | −0.2500 − 0.2500i | 0.2500 + 0.2500i |
| | 0.0000 + 0.3536i | 0.0000 + 0.3536i |
| | 0.2500 − 0.2500i | −0.2500 + 0.2500i |
| c13 = | 0.3536 + 0.0000i | 0.3536 + 0.0000i |
| | 0.2500 − 0.2500i | 0.2500 + 0.2500i |

TABLE 5-continued

| | | |
|---|---|---|
| | 0.2500 − 0.2500i | −0.2500 + 0.2500i |
| | 0.0000 − 0.3536i | −0.3536 − 0.0000i |
| | 0.0000 − 0.3536i | 0.0000 − 0.3536i |
| | −0.2500 − 0.2500i | 0.2500 − 0.2500i |
| | −0.2500 − 0.2500i | 0.2500 + 0.2500i |
| | −0.3536 − 0.0000i | −0.0000 + 0.3536i |
| c14 = | 0.3536 + 0.0000i | 0.3536 + 0.0000i |
| | 0.2500 − 0.2500i | 0.3536 + 0.0000i |
| | 0.2500 − 0.2500i | 0.2500 + 0.2500i |
| | 0.0000 − 0.3536i | 0.2500 + 0.2500i |
| | 0.0000 − 0.3536i | −0.0000 + 0.3536i |
| | −0.2500 − 0.2500i | −0.0000 + 0.3536i |
| | −0.2500 − 0.2500i | −0.2500 + 0.2500i |
| | −0.3536 − 0.0000i | −0.2500 + 0.2500i |
| c15 = | 0.3536 + 0.0000i | 0.3536 + 0.0000i |
| | 0.0000 − 0.3536i | 0.2500 + 0.2500i |
| | −0.2500 − 0.2500i | −0.2500 + 0.2500i |
| | −0.2500 + 0.2500i | −0.3536 − 0.0000i |
| | −0.0000 + 0.3536i | 0.0000 − 0.3536i |
| | 0.3536 + 0.0000i | 0.2500 − 0.2500i |
| | 0.2500 − 0.2500i | 0.2500 + 0.2500i |
| | −0.2500 − 0.2500i | −0.0000 + 0.3536i |
| c16 = | 0.3536 + 0.0000i | 0.3536 + 0.0000i |
| | 0.0000 − 0.3536i | 0.3536 + 0.0000i |
| | −0.2500 − 0.2500i | 0.2500 + 0.2500i |
| | −0.2500 + 0.2500i | 0.2500 + 0.2500i |
| | −0.0000 + 0.3536i | −0.0000 + 0.3536i |
| | 0.3536 + 0.0000i | −0.0000 + 0.3536i |
| | 0.2500 − 0.2500i | −0.2500 + 0.2500i |
| | −0.2500 − 0.2500i | −0.2500 + 0.2500i |

In another general aspect, there is provided a non-transitory computer-readable recording medium having stored therein program instructions to cause a processor to implement a method comprising accessing a memory storing a codebook comprising at least one of codeword matrices c1, c2, c3, c4, c5, c6, c7, c8, c9, c10, c11, c12, c13, c14, c15, and c16, and precoding a data stream to be transmitted based on the codebook, wherein the codeword matrices c1, c2, c3, c4, c5, c6, c7, c8, c9, c10, c11, c12, c13, c14, c15, and c16 are represented by at least one of the following Table 1 to Table 5:

TABLE 1

| | |
|---|---|
| c1 = | 0.5000 |
| | 0.5000 |
| | 0.5000 |
| | 0.5000 |
| | 0 |
| | 0 |
| | 0 |
| | 0 |
| c2 = | 0.5000 |
| | 0.0000 + 0.5000i |
| | −0.5000 + 0.0000i |
| | −0.0000 − 0.5000i |
| | 0 |
| | 0 |
| | 0 |
| | 0 |
| c3 = | 0.5000 |
| | −0.5000 + 0.0000i |
| | 0.5000 − 0.0000i |
| | −0.5000 + 0.0000i |
| | 0 |
| | 0 |
| | 0 |
| | 0 |
| c4 = | 0.5000 |
| | −0.0000 − 0.5000i |
| | −0.5000 + 0.0000i |
| | 0.0000 + 0.5000i |
| | 0 |
| | 0 |
| | 0 |
| | 0 |

TABLE 1-continued

| | |
|---|---|
| c5 = | 0.5000 |
| | 0.3536 + 0.3536i |
| | 0.0000 + 0.5000i |
| | −0.3536 + 0.3536i |
| | 0 |
| | 0 |
| | 0 |
| | 0 |
| c6 = | 0.5000 |
| | −0.3536 + 0.3536i |
| | −0.0000 − 0.5000i |
| | 0.3536 + 0.3536i |
| | 0 |
| | 0 |
| | 0 |
| | 0 |
| c7 = | 0.5000 |
| | −0.3536 − 0.3536i |
| | 0.0000 + 0.5000i |
| | 0.3536 − 0.3536i |
| | 0 |
| | 0 |
| | 0 |
| | 0 |
| c8 = | 0.5000 |
| | 0.3536 − 0.3536i |
| | −0.0000 − 0.5000i |
| | −0.3536 − 0.3536i |
| | 0 |
| | 0 |
| | 0 |
| | 0 |
| c9 = | 0 |
| | 0 |
| | 0 |
| | 0 |
| | 0.5000 |
| | 0.5000 |
| | 0.5000 |
| | 0.5000 |
| c10 = | 0 |
| | 0 |
| | 0 |
| | 0 |
| | 0.5000 |
| | 0.0000 + 0.5000i |
| | −0.5000 + 0.0000i |
| | −0.0000 − 0.5000i |
| c11 = | 0 |
| | 0 |
| | 0 |
| | 0 |
| | 0.5000 |
| | −0.5000 + 0.0000i |
| | 0.5000 − 0.0000i |
| | −0.5000 + 0.0000i |
| c12 = | 0 |
| | 0 |
| | 0 |
| | 0 |
| | 0.5000 |
| | −0.0000 − 0.5000i |
| | −0.5000 + 0.0000i |
| | 0.0000 + 0.5000i |
| c13 = | 0 |
| | 0 |
| | 0 |
| | 0 |
| | 0.5000 |
| | 0.3536 + 0.3536i |
| | 0.0000 + 0.5000i |
| | −0.3536 + 0.3536i |
| c14 = | 0 |
| | 0 |
| | 0 |
| | 0 |
| | 0.5000 |
| | −0.3536 + 0.3536i |
| | −0.0000 − 0.5000i |
| | 0.3536 + 0.3536i |

TABLE 1-continued

| | |
|---|---|
| c15 = | 0 |
| | 0 |
| | 0 |
| | 0 |
| | 0.5000 |
| | −0.3536 − 0.3536i |
| | 0.0000 + 0.5000i |
| | 0.3536 − 0.3536i |
| c16 = | 0 |
| | 0 |
| | 0 |
| | 0 |
| | 0.5000 |
| | 0.3536 − 0.3536i |
| | −0.0000 − 0.5000i |
| | −0.3536 − 0.3536i |

TABLE 2

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.3536 + 0.0000i |
| | 0.3536 − 0.0000i |
| | −0.3536 + 0.0000i |
| | 0.3536 |
| | −0.3536 + 0.0000i |
| | 0.3536 − 0.0000i |
| | −0.3536 + 0.0000i |
| c4 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c5 = | −0.3536 |
| | −0.3536 |
| | −0.3536 |
| | −0.3536 |
| | 0.3536 |
| | 0.3536 |
| | 0.3536 |
| | 0.3536 |
| c6 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c7 = | −0.3536 |
| | 0.3536 − 0.0000i |
| | −0.3536 + 0.0000i |
| | 0.3536 − 0.0000i |
| | 0.3536 |
| | −0.3536 + 0.0000i |
| | 0.3536 − 0.0000i |
| | −0.3536 + 0.0000i |
| c8 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c9 = | 0.3536 |
| | 0.2500 + 0.2500i |
| | 0.0000 + 0.3536i |
| | −0.2500 + 0.2500i |
| | 0.3536 |
| | 0.2500 + 0.2500i |
| | 0.0000 + 0.3536i |
| | −0.2500 + 0.2500i |
| c10 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c11 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c12 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c13 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c14 = | −0.3536 |
| | 0.2500 − 0.2500i |
| | 0.0000 + 0.3536i |
| | −0.2500 − 0.2500i |
| 0.3536 | |
| | −0.2500 + 0.2500i |
| | −0.0000 − 0.3536i |
| | 0.2500 + 0.2500i |
| c15 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c16 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |

TABLE 3

| | |
|---|---|
| c1 = | 0.3536 |
| | 0.3536 |
| | 0.3536 |
| | 0.3536 |

TABLE 3-continued

| | |
|---|---|
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c4 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c5 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c6 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c7 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c8 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c9 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c10 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c11 = | −0.3536 |
| | 0.2500 + 0.2500i |
| | −0.0000 − 0.3536i |
| | −0.2500 + 0.2500i |

TABLE 3-continued

| | |
|---|---|
| | 0.3536 |
| | −0.2500 − 0.2500i |
| | 0.0000 + 0.3536i |
| | 0.2500 − 0.2500i |
| c12 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |
| c13 = | 0.3536 + 0.0000i |
| | 0.2500 − 0.2500i |
| | 0.2500 − 0.2500i |
| | 0.0000 − 0.3536i |
| | 0.0000 − 0.3536i |
| | −0.2500 − 0.2500i |
| | −0.2500 − 0.2500i |
| | −0.3536 − 0.0000i |
| c14 = | 0.3536 + 0.0000i |
| | 0.0000 − 0.3536i |
| | −0.2500 − 0.2500i |
| | −0.2500 + 0.2500i |
| | −0.0000 + 0.3536i |
| | 0.3536 + 0.0000i |
| | 0.2500 − 0.2500i |
| | −0.2500 − 0.2500i |
| c15 = | 0.3536 + 0.0000i |
| | 0.2500 + 0.2500i |
| | −0.2500 + 0.2500i |
| | −0.3536 − 0.0000i |
| | 0.0000 − 0.3536i |
| | 0.2500 − 0.2500i |
| | 0.2500 + 0.2500i |
| | −0.0000 + 0.3536i |
| c16 = | 0.3536 + 0.0000i |
| | 0.3536 + 0.0000i |
| | 0.2500 + 0.2500i |
| | 0.2500 + 0.2500i |
| | −0.0000 + 0.3536i |
| | −0.0000 + 0.3536i |
| | −0.2500 + 0.2500i |
| | −0.2500 + 0.2500i |

TABLE 4

| | | |
|---|---|---|
| c1 = | 0.3536 | −0.3536 |
| | 0.3536 | −0.3536 |
| | 0.3536 | −0.3536 |
| | 0.3536 | −0.3536 |
| | 0.3536 | 0.3536 |
| | 0.3536 | 0.3536 |
| | 0.3536 | 0.3536 |
| | 0.3536 | 0.3536 |
| c2 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c3 = | 0.3536 | −0.3536 |
| | −0.3536 + 0.0000i | 0.3536 − 0.0000i |
| | 0.3536 − 0.0000i | −0.3536 + 0.0000i |
| | −0.3536 + 0.0000i | 0.3536 − 0.0000i |
| | 0.3536 | 0.3536 |
| | −0.3536 + 0.0000i | −0.3536 + 0.0000i |
| | 0.3536 − 0.0000i | 0.3536 − 0.0000i |
| | −0.3536 + 0.0000i | −0.3536 + 0.0000i |
| c4 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |

TABLE 4-continued

| | | |
|---|---|---|
| | −0.3536 + 0.0000i | −0.3536 + 0.0000i |
| | 0.0000 + 0.3536i | 0.0000 + 0.3536i |
| c5 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c6 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c7 = | 0.3536 | −0.3536 |
| | −0.3536 + 0.0000i | 0.2500 + 0.2500i |
| | 0.3536 − 0.0000i | −0.0000 − 0.3536i |
| | −0.3536 + 0.0000i | −0.2500 + 0.2500i |
| | 0.3536 | 0.3536 |
| | −0.3536 + 0.0000i | −0.2500 − 0.2500i |
| | 0.3536 − 0.0000i | 0.0000 + 0.3536i |
| | −0.3536 + 0.0000i | 0.2500 − 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | 0.3536 | −0.3536 |
| | 0.2500 + 0.2500i | −0.3536 |
| | 0.0000 + 0.3536i | −0.3536 |
| | −0.2500 + 0.2500i | −0.3536 |
| | 0.3536 | 0.3536 |
| | 0.2500 + 0.2500i | 0.3536 |
| | 0.0000 + 0.3536i | 0.3536 |
| | −0.2500 + 0.2500i | 0.3536 |
| c10 = | 0.3536 | −0.3536 |
| | −0.2500 + 0.2500i | −0.0000 − 0.3536i |
| | −0.0000 − 0.3536i | 0.3536 − 0.0000i |
| | 0.2500 + 0.2500i | 0.0000 + 0.3536i |
| | 0.3536 | 0.3536 |
| | −0.2500 + 0.2500i | 0.0000 + 0.3536i |
| | −0.0000 − 0.3536i | −0.3536 + 0.0000i |
| | 0.2500 + 0.2500i | −0.0000 − 0.3536i |
| c11 = | 0.3536 | −0.3536 |
| | −0.2500 − 0.2500i | 0.3536 − 0.0000i |
| | 0.0000 + 0.3536i | −0.3536 + 0.0000i |
| | 0.2500 − 0.2500i | 0.3536 − 0.0000i |
| | 0.3536 | 0.3536 |
| | −0.2500 − 0.2500i | −0.3536 + 0.0000i |
| | 0.0000 + 0.3536i | 0.3536 − 0.0000i |
| | 0.2500 − 0.2500i | −0.3536 + 0.0000i |
| c12 = | 0.3536 | −0.3536 |
| | 0.2500 − 0.2500i | 0.0000 + 0.3536i |
| | −0.0000 − 0.3536i | 0.3536 − 0.0000i |
| | −0.2500 − 0.2500i | −0.0000 − 0.3536i |
| | 0.3536 | 0.3536 |
| | 0.2500 − 0.2500i | −0.0000 − 0.3536i |
| | −0.0000 − 0.3536i | −0.3536 + 0.0000i |
| | −0.2500 − 0.2500i | 0.0000 + 0.3536i |
| c13 = | 0.3536 | −0.3536 |
| | 0.2500 + 0.2500i | −0.2500 − 0.2500i |
| | 0.0000 + 0.3536i | −0.0000 − 0.3536i |
| | −0.2500 + 0.2500i | 0.2500 − 0.2500i |
| | 0.3536 | 0.3536 |
| | 0.2500 + 0.2500i | 0.2500 + 0.2500i |
| | 0.0000 + 0.3536i | 0.0000 + 0.3536i |
| | −0.2500 + 0.2500i | −0.2500 + 0.2500i |
| c14 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |

TABLE 4-continued

| | | |
|---|---|---|
| | −0.0000 − 0.3536i | −0.0000 − 0.3536i |
| | 0.2500 + 0.2500i | 0.2500 + 0.2500i |
| c15 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c16 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |

TABLE 5

| | | |
|---|---|---|
| c1 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c2 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c3 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c4 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c5 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |
| c6 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c7 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |

TABLE 5-continued

| | | |
|---|---|---|
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | −0.3536 | 0.3536 |
| | −0.0000 − 0.3536i | −0.2500 + 0.2500i |
| | 0.3536 − 0.0000i | −0.0000 − 0.3536i |
| | 0.0000 + 0.3536i | 0.2500 + 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c10 = | −0.3536 | 0.3536 |
| | 0.0000 + 0.3536i | 0.2500 − 0.2500i |
| | 0.3536 − 0.0000i | −0.0000 − 0.3536i |
| | −0.0000 − 0.3536i | −0.2500 − 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c11 = | 0.3536 | −0.3536 |
| | 0.3536 | 0.2500 + 0.2500i |
| | 0.3536 | −0.0000 − 0.3536i |
| | 0.3536 | −0.2500 + 0.2500i |
| | 0.3536 | 0.3536 |
| | 0.3536 | −0.2500 − 0.2500i |
| | 0.3536 | 0.0000 + 0.3536i |
| | 0.3536 | 0.2500 − 0.2500i |
| c12 = | 0.3536 | −0.3536 |
| | −0.2500 − 0.2500i | −0.2500 − 0.2500i |
| | 0.0000 + 0.3536i | −0.0000 − 0.3536i |
| | 0.2500 − 0.2500i | 0.2500 − 0.2500i |
| | 0.3536 | 0.3536 |
| | −0.2500 − 0.2500i | 0.2500 + 0.2500i |
| | 0.0000 + 0.3536i | 0.0000 + 0.3536i |
| | 0.2500 − 0.2500i | −0.2500 + 0.2500i |
| c13 = | 0.3536 + 0.0000i | 0.3536 + 0.0000i |
| | 0.2500 − 0.2500i | 0.2500 + 0.2500i |
| | 0.2500 − 0.2500i | −0.2500 + 0.2500i |
| | 0.0000 − 0.3536i | −0.3536 − 0.0000i |
| | 0.0000 − 0.3536i | 0.0000 − 0.3536i |
| | −0.2500 − 0.2500i | 0.2500 − 0.2500i |
| | −0.2500 − 0.2500i | 0.2500 + 0.2500i |
| | −0.3536 − 0.0000i | −0.0000 + 0.3536i |
| c14 = | 0.3536 + 0.0000i | 0.3536 + 0.0000i |
| | 0.2500 − 0.2500i | 0.3536 + 0.0000i |
| | 0.2500 − 0.2500i | 0.2500 + 0.2500i |
| | 0.0000 − 0.3536i | 0.2500 + 0.2500i |
| | 0.0000 − 0.3536i | −0.0000 + 0.3536i |
| | −0.2500 − 0.2500i | −0.0000 + 0.3536i |
| | −0.2500 − 0.2500i | −0.2500 + 0.2500i |
| | −0.3536 − 0.0000i | −0.2500 + 0.2500i |
| c15 = | 0.3536 + 0.0000i | 0.3536 + 0.0000i |
| | 0.0000 − 0.3536i | 0.2500 + 0.2500i |
| | −0.2500 − 0.2500i | −0.2500 + 0.2500i |
| | −0.2500 + 0.2500i | −0.3536 − 0.0000i |
| | −0.0000 + 0.3536i | 0.0000 − 0.3536i |
| | 0.3536 + 0.0000i | 0.2500 − 0.2500i |
| | 0.2500 − 0.2500i | 0.2500 + 0.2500i |
| | −0.2500 − 0.2500i | −0.0000 + 0.3536i |
| c16 = | 0.3536 + 0.0000i | 0.3536 + 0.0000i |
| | 0.0000 − 0.3536i | 0.3536 + 0.0000i |
| | −0.2500 − 0.2500i | 0.2500 + 0.2500i |
| | −0.2500 + 0.2500i | 0.2500 + 0.2500i |
| | −0.0000 + 0.3536i | −0.0000 + 0.3536i |
| | 0.3536 + 0.0000i | −0.0000 + 0.3536i |
| | 0.2500 − 0.2500i | −0.2500 + 0.2500i |
| | −0.2500 − 0.2500i | −0.2500 + 0.2500i |

In another general aspect, there is provided a non-transitory storage medium storing a codebook used by a transmitter and at least one receiver in a MIMO communication system comprising the transmitter and the at least one receiver, wherein the codebook comprises at least one of codeword matrices c1, c2, c3, c4, c5, c6, c7, c8, c9, c10, c11, c12, c13, c14, c15, and c16, and the codeword matrices c1, c2, c3, c4, c5, c6, c7, c8, c9, c10, c11, c12, c13, c14, c15, and c16 are represented by at least one of the following Table 1 to Table 5:

TABLE 1

| | |
|---|---|
| c1 = | 0.5000 |
| | 0.5000 |
| | 0.5000 |
| | 0.5000 |
| | 0 |
| | 0 |
| | 0 |
| | 0 |
| c2 = | 0.5000 |
| | 0.0000 + 0.5000i |
| | −0.5000 + 0.0000i |
| | −0.0000 − 0.5000i |
| | 0 |
| | 0 |
| | 0 |
| | 0 |
| c3 = | 0.5000 |
| | −0.5000 + 0.0000i |
| | 0.5000 − 0.0000i |
| | −0.5000 + 0.0000i |
| | 0 |
| | 0 |
| | 0 |
| | 0 |
| c4 = | 0.5000 |
| | −0.0000 − 0.5000i |
| | −0.5000 + 0.0000i |
| | 0.0000 + 0.5000i |
| | 0 |
| | 0 |
| | 0 |
| | 0 |
| c5 = | 0.5000 |
| | 0.3536 + 0.3536i |
| | 0.0000 + 0.5000i |
| | −0.3536 + 0.3536i |
| | 0 |
| | 0 |
| | 0 |
| | 0 |
| c6 = | 0.5000 |
| | −0.3536 + 0.3536i |
| | −0.0000 − 0.5000i |
| | 0.3536 + 0.3536i |
| | 0 |
| | 0 |
| | 0 |
| | 0 |
| c7 = | 0.5000 |
| | −0.3536 − 0.3536i |
| | 0.0000 + 0.5000i |
| | 0.3536 − 0.3536i |
| | 0 |
| | 0 |
| | 0 |
| | 0 |
| c8 = | 0.5000 |
| | 0.3536 − 0.3536i |
| | −0.0000 − 0.5000i |
| | −0.3536 − 0.3536i |
| | 0 |
| | 0 |
| | 0 |
| | 0 |
| c9 = | 0 |
| | 0 |
| | 0 |
| | 0 |
| | 0.5000 |
| | 0.5000 |
| | 0.5000 |
| | 0.5000 |
| c10 = | 0 |
| | 0 |
| | 0 |

TABLE 1-continued

| | |
|---|---|
| | 0 |
| | 0.5000 |
| | 0.0000 + 0.5000i |
| | −0.5000 + 0.0000i |
| | −0.0000 − 0.5000i |
| c11 = | 0 |
| | 0 |
| | 0 |
| | 0 |
| | 0.5000 |
| | −0.5000 + 0.0000i |
| | 0.5000 − 0.0000i |
| | −0.5000 + 0.0000i |
| c12 = | 0 |
| | 0 |
| | 0 |
| | 0 |
| | 0.5000 |
| | −0.0000 − 0.5000i |
| | −0.5000 + 0.0000i |
| | 0.0000 + 0.5000i |
| c13 = | 0 |
| | 0 |
| | 0 |
| | 0 |
| | 0.5000 |
| | 0.3536 + 0.3536i |
| | 0.0000 + 0.5000i |
| | −0.3536 + 0.3536i |
| c14 = | 0 |
| | 0 |
| | 0 |
| | 0 |
| | 0.5000 |
| | −0.3536 + 0.3536i |
| | −0.0000 − 0.5000i |
| | 0.3536 + 0.3536i |
| c15 = | 0 |
| | 0 |
| | 0 |
| | 0 |
| | 0.5000 |
| | −0.3536 − 0.3536i |
| | 0.0000 + 0.5000i |
| | 0.3536 − 0.3536i |
| c16 = | 0 |
| | 0 |
| | 0 |
| | 0 |
| | 0.5000 |
| | 0.3536 − 0.3536i |
| | −0.0000 − 0.5000i |
| | −0.3536 − 0.3536i |

TABLE 2

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.3536 + 0.0000i |
| | 0.3536 − 0.0000i |
| | −0.3536 + 0.0000i |
| | 0.3536 |
| | −0.3536 + 0.0000i |
| | 0.3536 − 0.0000i |
| | −0.3536 + 0.0000i |
| c4 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c5 = | −0.3536 |
| | −0.3536 |
| | −0.3536 |
| | −0.3536 |
| | 0.3536 |
| | 0.3536 |
| | 0.3536 |
| | 0.3536 |
| c6 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c7 = | −0.3536 |
| | 0.3536 − 0.0000i |
| | −0.3536 + 0.0000i |
| | 0.3536 − 0.0000i |
| | 0.3536 |
| | −0.3536 + 0.0000i |
| | 0.3536 − 0.0000i |
| | −0.3536 + 0.0000i |
| c8 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c9 = | 0.3536 |
| | 0.2500 + 0.2500i |
| | 0.0000 + 0.3536i |
| | −0.2500 + 0.2500i |
| | 0.3536 |
| | 0.2500 + 0.2500i |
| | 0.0000 + 0.3536i |
| | −0.2500 + 0.2500i |
| c10 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c11 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c12 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c13 = | −0.3536 |
| | −0.2500 − 0.2500i |
| | −0.0000 − 0.3536i |
| | 0.2500 − 0.2500i |
| | 0.3536 |

TABLE 2-continued

| | |
|---|---|
| | 0.2500 + 0.2500i |
| | 0.0000 + 0.3536i |
| | −0.2500 + 0.2500i |
| c14 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c15 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c16 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |

TABLE 3

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c4 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c5 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c6 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c7 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c8 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c9 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c10 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c11 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c12 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |
| c13 = | 0.3536 + 0.0000i |
| | 0.2500 − 0.2500i |
| | 0.2500 − 0.2500i |
| | 0.0000 − 0.3536i |
| | 0.0000 − 0.3536i |
| | −0.2500 − 0.2500i |
| | −0.2500 − 0.2500i |
| | −0.3536 − 0.0000i |
| c14 = | 0.3536 + 0.0000i |
| | 0.0000 − 0.3536i |
| | −0.2500 − 0.2500i |
| | −0.2500 + 0.2500i |
| | −0.0000 + 0.3536i |
| | 0.3536 + 0.0000i |
| | 0.2500 − 0.2500i |
| | −0.2500 − 0.2500i |
| c15 = | 0.3536 + 0.0000i |
| | 0.2500 + 0.2500i |
| | −0.2500 + 0.2500i |
| | −0.3536 − 0.0000i |
| | 0.0000 − 0.3536i |
| | 0.2500 − 0.2500i |
| | 0.2500 + 0.2500i |
| | −0.0000 + 0.3536i |
| c16 = | 0.3536 + 0.0000i |
| | 0.3536 + 0.0000i |
| | 0.2500 + 0.2500i |
| | 0.2500 + 0.2500i |
| | −0.0000 + 0.3536i |
| | −0.0000 + 0.3536i |

TABLE 3-continued

| |
|---|
| −0.2500 + 0.2500i |
| −0.2500 + 0.2500i |

TABLE 4

| | | |
|---|---|---|
| c1 = | 0.3536 | −0.3536 |
| | 0.3536 | −0.3536 |
| | 0.3536 | −0.3536 |
| | 0.3536 | −0.3536 |
| | 0.3536 | 0.3536 |
| | 0.3536 | 0.3536 |
| | 0.3536 | 0.3536 |
| | 0.3536 | 0.3536 |
| c2 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c3 = | 0.3536 | −0.3536 |
| | −0.3536 + 0.0000i | 0.3536 − 0.0000i |
| | 0.3536 − 0.0000i | −0.3536 + 0.0000i |
| | −0.3536 + 0.0000i | 0.3536 − 0.0000i |
| | 0.3536 | 0.3536 |
| | −0.3536 + 0.0000i | −0.3536 + 0.0000i |
| | 0.3536 − 0.0000i | 0.3536 − 0.0000i |
| | −0.3536 + 0.0000i | −0.3536 + 0.0000i |
| c4 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c5 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c6 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c7 = | 0.3536 | −0.3536 |
| | −0.3536 + 0.0000i | 0.2500 + 0.2500i |
| | 0.3536 − 0.0000i | −0.0000 − 0.3536i |
| | −0.3536 + 0.0000i | −0.2500 + 0.2500i |
| | 0.3536 | 0.3536 |
| | −0.3536 + 0.0000i | −0.2500 − 0.2500i |
| | 0.3536 − 0.0000i | 0.0000 + 0.3536i |
| | −0.3536 + 0.0000i | 0.2500 − 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | 0.3536 | −0.3536 |
| | 0.2500 + 0.2500i | −0.3536 |
| | 0.0000 + 0.3536i | −0.3536 |
| | −0.2500 + 0.2500i | −0.3536 |
| | 0.3536 | 0.3536 |
| | 0.2500 + 0.2500i | 0.3536 |
| | 0.0000 + 0.3536i | 0.3536 |
| | −0.2500 + 0.2500i | 0.3536 |

TABLE 4-continued

| | | |
|---|---|---|
| c10 = | 0.3536 | −0.3536 |
| | −0.2500 + 0.2500i | −0.0000 − 0.3536i |
| | −0.0000 − 0.3536i | 0.3536 − 0.0000i |
| | 0.2500 + 0.2500i | 0.0000 + 0.3536i |
| | 0.3536 | 0.3536 |
| | −0.2500 + 0.2500i | 0.0000 + 0.3536i |
| | −0.0000 − 0.3536i | −0.3536 + 0.0000i |
| | 0.2500 + 0.2500i | −0.0000 − 0.3536i |
| c11 = | 0.3536 | −0.3536 |
| | −0.2500 − 0.2500i | 0.3536 − 0.0000i |
| | 0.0000 + 0.3536i | −0.3536 + 0.0000i |
| | 0.2500 − 0.2500i | 0.3536 − 0.0000i |
| | 0.3536 | 0.3536 |
| | −0.2500 − 0.2500i | −0.3536 + 0.0000i |
| | 0.0000 + 0.3536i | 0.3536 − 0.0000i |
| | 0.2500 − 0.2500i | −0.3536 + 0.0000i |
| c12 = | 0.3536 | −0.3536 |
| | 0.2500 − 0.2500i | 0.0000 + 0.3536i |
| | −0.0000 − 0.3536i | 0.3536 − 0.0000i |
| | −0.2500 − 0.2500i | −0.0000 − 0.3536i |
| | 0.3536 | 0.3536 |
| | 0.2500 − 0.2500i | −0.0000 − 0.3536i |
| | −0.0000 − 0.3536i | −0.3536 + 0.0000i |
| | −0.2500 − 0.2500i | 0.0000 + 0.3536i |
| c13 = | 0.3536 | −0.3536 |
| | 0.2500 + 0.2500i | −0.2500 − 0.2500i |
| | 0.0000 + 0.3536i | −0.0000 − 0.3536i |
| | −0.2500 + 0.2500i | 0.2500 − 0.2500i |
| | 0.3536 | 0.3536 |
| | 0.2500 + 0.2500i | 0.2500 + 0.2500i |
| | 0.0000 + 0.3536i | 0.0000 + 0.3536i |
| | −0.2500 + 0.2500i | −0.2500 + 0.2500i |
| c14 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c15 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c16 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |

TABLE 5

| | | |
|---|---|---|
| c1 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c2 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c3 = | 0.3536 | −0.3536 |
| | −0.2500 + 0.2500i | 0.2500 − 0.2500i |

TABLE 5-continued

| | | |
|---|---|---|
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c4 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c5 = | 0.3536 | −0.3536 |
| | 0.2500 − 0.2500i | 0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |
| c6 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c7 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | −0.3536 | 0.3536 |
| | −0.0000 − 0.3536i | −0.2500 + 0.2500i |
| | 0.3536 − 0.0000i | −0.0000 − 0.3536i |
| | 0.0000 + 0.3536i | 0.2500 + 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c10 = | −0.3536 | 0.3536 |
| | 0.0000 + 0.3536i | 0.2500 − 0.2500i |
| | 0.3536 − 0.0000i | −0.0000 − 0.3536i |
| | −0.0000 − 0.3536i | −0.2500 − 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c11 = | 0.3536 | −0.3536 |
| | 0.3536 | 0.2500 + 0.2500i |
| | 0.3536 | −0.0000 − 0.3536i |
| | 0.3536 | −0.2500 + 0.2500i |
| | 0.3536 | 0.3536 |
| | 0.3536 | −0.2500 − 0.2500i |
| | 0.3536 | 0.0000 + 0.3536i |
| | 0.3536 | 0.2500 − 0.2500i |
| c12 = | 0.3536 | −0.3536 |
| | −0.2500 − 0.2500i | −0.2500 − 0.2500i |
| | 0.0000 + 0.3536i | −0.0000 − 0.3536i |
| | 0.2500 − 0.2500i | 0.2500 − 0.2500i |
| | 0.3536 | 0.3536 |
| | −0.2500 − 0.2500i | 0.2500 + 0.2500i |
| | 0.0000 + 0.3536i | 0.0000 + 0.3536i |
| | 0.2500 − 0.2500i | 0.2500 + 0.2500i |
| c13 = | 0.3536 + 0.0000i | 0.3536 + 0.0000i |
| | 0.2500 − 0.2500i | 0.2500 + 0.2500i |

TABLE 5-continued

| | | |
|---|---|---|
| | 0.2500 − 0.2500i | −0.2500 + 0.2500i |
| | 0.0000 − 0.3536i | −0.3536 − 0.0000i |
| | 0.0000 − 0.3536i | 0.0000 − 0.3536i |
| | −0.2500 − 0.2500i | 0.2500 − 0.2500i |
| | −0.2500 − 0.2500i | 0.2500 + 0.2500i |
| | −0.3536 − 0.0000i | −0.0000 + 0.3536i |
| c14 = | 0.3536 + 0.0000i | 0.3536 + 0.0000i |
| | 0.2500 − 0.2500i | 0.3536 + 0.0000i |
| | 0.2500 − 0.2500i | 0.2500 + 0.2500i |
| | 0.0000 − 0.3536i | 0.2500 + 0.2500i |
| | 0.0000 − 0.3536i | −0.0000 + 0.3536i |
| | −0.2500 − 0.2500i | −0.0000 + 0.3536i |
| | −0.2500 − 0.2500i | −0.2500 + 0.2500i |
| | −0.3536 − 0.0000i | −0.2500 + 0.2500i |
| c15 = | 0.3536 + 0.0000i | 0.3536 + 0.0000i |
| | 0.0000 − 0.3536i | 0.2500 + 0.2500i |
| | −0.2500 − 0.2500i | −0.2500 + 0.2500i |
| | −0.2500 + 0.2500i | −0.3536 − 0.0000i |
| | −0.0000 + 0.3536i | 0.0000 − 0.3536i |
| | 0.3536 + 0.0000i | 0.2500 − 0.2500i |
| | 0.2500 − 0.2500i | 0.2500 + 0.2500i |
| | −0.2500 − 0.2500i | −0.0000 + 0.3536i |
| c16 = | 0.3536 + 0.0000i | 0.3536 + 0.0000i |
| | 0.0000 − 0.3536i | 0.3536 + 0.0000i |
| | −0.2500 − 0.2500i | 0.2500 + 0.2500i |
| | −0.2500 + 0.2500i | 0.2500 + 0.2500i |
| | −0.0000 + 0.3536i | −0.0000 + 0.3536i |
| | 0.3536 + 0.0000i | −0.0000 + 0.3536i |
| | 0.2500 − 0.2500i | −0.2500 + 0.2500i |
| | −0.2500 − 0.2500i | −0.2500 + 0.2500i |

In another general aspect, there is provided a codebook design method, comprising generating at least 16 vectors each having a dimension of 8×1 based on at least one 4×4 discrete Fourier transform (DFT) matrix, designing a codebook comprising a plurality of codeword matrices based on at least one of the at least 16 vectors, and storing the codebook in a memory.

The generating may comprise generating the at least 16 vectors based on the at least one DFT matrix and a 4×4 zero matrix.

The designing may comprise selecting all of the at least 16 vectors as the codeword matrices.

The designing may comprise rotating the at least 16 vectors using a rotation matrix corresponding to an angle, according to arrangement of transmit antennas, and selecting all of the rotated at least 16 vectors as the codeword matrices.

The designing may comprise rotating the at least 16 vectors using a rotation matrix corresponding to an angle, according to arrangement of transmit antennas, extracting a predetermined number of rotated vectors from the rotated at least 16 vectors, and selecting, as the codeword matrices, the predetermined number of rotated vectors and pre-defined vectors.

The designing may comprise rotating the at least 16 vectors using a rotation matrix corresponding to an angle, according to arrangement of transmit antennas, and selecting, as the codeword matrices, at least 16 matrices each having a dimension of 8×2, each of the at least 16 matrices comprising two vectors among the rotated at least 16 vectors.

The designing may comprise rotating the at least 16 vectors using a rotation matrix corresponding to an angle, according to arrangement of transmit antennas, extracting a predetermined number of rotated vectors from the rotated at least 16 vectors, and selecting, as the codeword matrices, the at least 16 matrices each having a dimension of 8×2, each of the 16 matrices comprising two vectors among the predetermined number of rotated vectors and pre-defined vectors.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
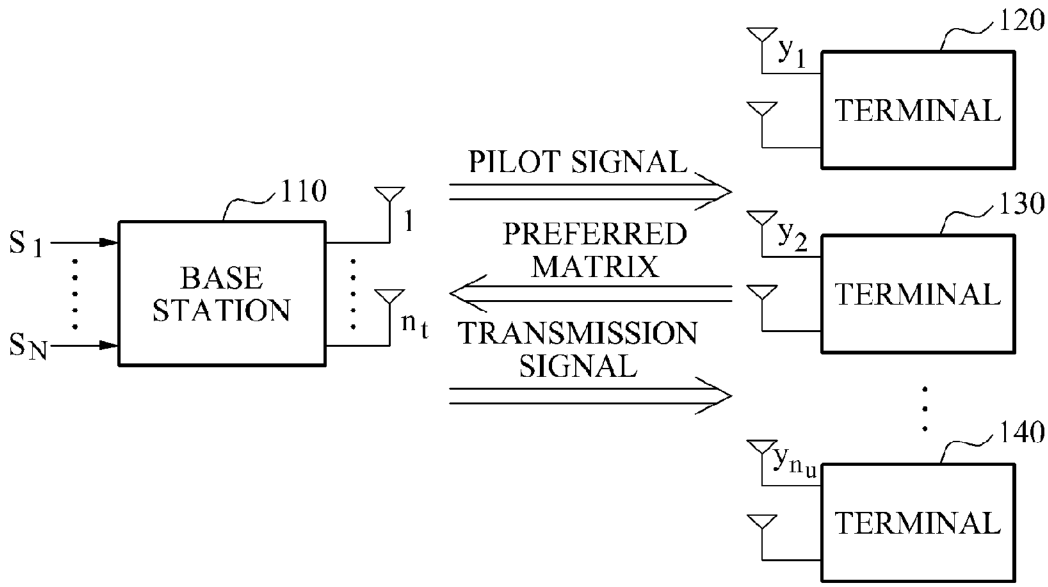
FIG. 1 is a diagram illustrating an example of a closed-loop multiple-input multiple-output (MIMO) communication system.

FIG. 1 illustrates an example of a closed-loop multiple-input multiple-output (MIMO) communication system.

Referring to FIG. 1, the closed-loop MIMO communication system includes a base station 110 and terminals 120, 130, and 140.

Although FIG. 1 illustrates an example of a multi-user MIMO communication system, the example may be similarly applied to a single-user MIMO communication system. The term "closed-loop" indicates that the terminals 120, 130, and 140 feed back information containing channel information to the base station 110. The base station 110 may perform precoding based on the feedback information. The codebook may be applied to the closed-look MIMO communication system or to an open-loop MIMO communication system. Accordingly, it should be understood that the example codebooks described herein may be applied to various types of communication systems.

In a downlink of the MIMO communication system, the base station 110 operates as a transmitter, and each of the terminals 120, 130, and 140 operate as receivers. In an uplink of the MIMO communication system, the base station 110 operates as a receiver, and the terminals 120, 130, and 140 operate as transmitters. Although descriptions are made generally based on the downlink, examples may be similarly applied to the uplink.

The base station 110 may include, for example, a fixed base station such as a macro base station, a small base station such as a femto base station, a pico base station, a relay, and the like. Accordingly, various types of communication apparatuses may be configured to perform uplink and downlink communication with the terminals 120, 130, and 140.

One or more antennas may be installed in the base station 110. One or more antennas may be installed in each of the terminals 120, 130, and 140. For example, the base station 110 and the terminals 120, 13, and 140, may each have one antenna, two antennas, three antennas, four antennas, or more. A channel may be established between the base station 110 and each of the terminals 120, 130, and 140. Signals may be transmitted and received via established channels.

In the downlink, the base station 110 may transmit one or more data streams to each of the terminals 120, 130, and 140. For example, the base station may transmit two data streams, three data streams, four data streams, or more. The base station 110 may generate a precoding matrix based on codeword matrices included in a codebook, and generate a transmission signal based on the precoding matrix.

The base station 110 may transmit known signals, for example, pilot signals, and the like, to each of the terminals 120, 130, and 140, via respective downlink channels. Each of the terminals 120, 130, and 140 may respectively receive a known signal from the base station 110, and use the known signal to detect a channel between the base station 110 and the respective terminal.

Each of the terminals 120, 130, and 140 may select a preferred codeword matrix from a plurality of codeword matrices included in a codebook. The terminals may feed back, to the base station 110, feedback information associated with the preferred codeword matrix. For example, the feedback information may include "preferred vector information" and/or "preferred matrix information." The base station 110 may determine the preferred codeword matrix from the codebook based on the feedback information, and calculate a precoding matrix based on the preferred codeword matrix. Accordingly, the base station 110 may determine the precoding matrix to maximize the total sum of data rates.

Each of the terminals 120, 130, and 140 may select the preferred codeword matrix out of a possible $2^B$ codeword matrices based on, for example, an achievable data rate and/or a signal-to-interference and noise ratio (SINR). In this example, the variable "B" refers to a number of feedback bits. Accordingly, the number of possible codeword matrices may be equal to the number two multiplied by itself B times. Each of the terminals 120, 130, and 140 may determine a preferred transmission rank. The transmission rank may correspond to a number of data streams.

The base station 110 may select one or more of the terminals 120, 130, and 140 based on various user selection algorithms, for example, a semi-orthogonal user selection (SUS) algorithm, a greedy user selection (GUS) algorithm, and the like.

In the example shown in FIG. 1, the variable "$n_t$" refers to an index of each transmit antenna installed in the base station, $S_1, \ldots, S_N$ refers to a data stream, and $y_1$, $y_2$, and $y_{nu}$ refers to a signal received at the respective terminals 120, 130, and 140.

Figure 2:
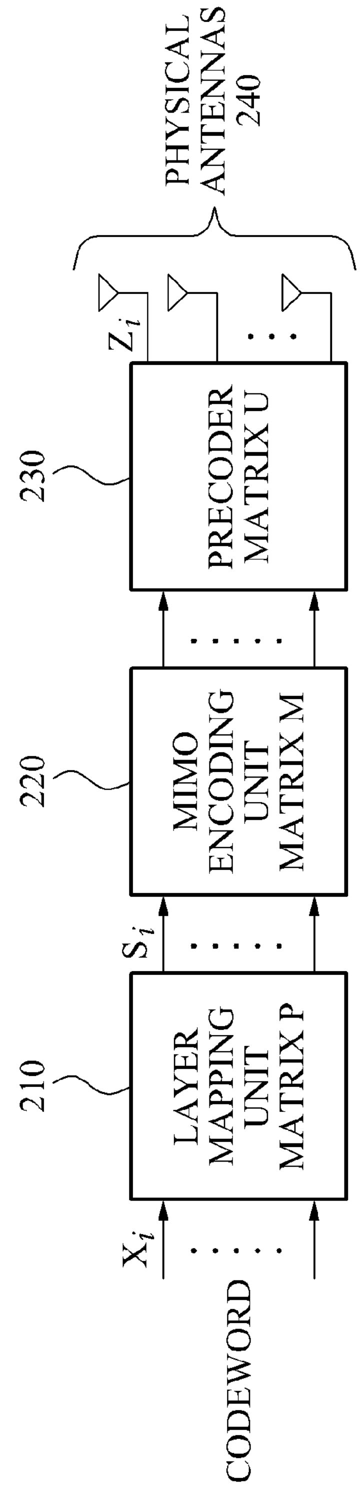
FIG. 2 is a diagram illustrating an example of a base station in a downlink transmission.

FIG. 2 illustrates an example of a base station in a downlink. Referring to FIG. 2, the base station includes a layer mapping unit 210, a MIMO encoding unit 220, a precoder 230, and $N_t$ antennas 240.

One or more codeword matrices for one or more terminals may be mapped to at least one layer. When a codeword matrix "x" has a dimension of $N_C \times 1$, the layer mapping unit 210 may map the codeword matrix 'x' to at least one layer according to $N_s \times N_c$ matrix P. For example, the number of layers may correspond to the number of layers or the number of channels. Accordingly, Equation 1 may be represented as shown below.

$$s=Px \quad \text{[Equation 1]}$$

The MIMO encoding unit 220 may perform space-time modulation with respect to "s" according to $N_s \times N_s$ matrix function M. For example, the MIMO encoding unit 220 may perform space-frequency block coding, spatial multiplexing, and the like, based on a transmission rank. In Equation 1, "s" refers to a data stream before performing MIMO encoding.

The precoder 230 may precode outputs, for example, data streams of the MIMO encoding unit 220, and generate transmission signals to be transmitted via the respective antennas 240. A number or dimension of outputs, for example, data streams of the MIMO encoding unit 220 may indicate a transmission rank. The precoder 230 may generate a transmission signal according to an $N_t \times N_s$ precoding matrix U. Accordingly, Equation 2 may be represented as shown below.

$$z=UM(s) \quad \text{[Equation 2]}$$

As referred to herein, the precoding matrix is represented by W, and the transmission rank or the number of effective antennas is represented by R. The precoding matrix W may have a dimension of $N_t \times R$. When the MIMO encoding unit 220 uses spatial multiplexing, "z" may be represented as shown below in Equation 3.

$$z = WB = \begin{bmatrix} u_{11} & u_{1R} \\ \vdots & \vdots \\ u_{Nt1} & u_{NtR} \end{bmatrix} \begin{bmatrix} s_1 \\ \vdots \\ s_R \end{bmatrix} \quad \text{[Equation 3]}$$

Referring to Equation 3, the precoding matrix W is also referred to as a "weighting matrix," and "z" refers to a transmission signal after performing precoding.

The dimension of the precoding matrix W may be determined according to the transmission rank and/or the number of physical antennas 240. For example, when the number $N_t$ of physical antennas 240 is four and the transmission rank is "2", the precoding matrix W may be represented as shown below in Equation operation 4.

$$W = \begin{bmatrix} W_{11} & W_{12} \\ W_{21} & W_{22} \\ W_{31} & W_{32} \\ W_{41} & W_{42} \end{bmatrix} \quad \text{[Equation operation 4]}$$

A codebook may include a varios properties. For example, the codebook used in a closed-loop MIMO communication system or an open-loop MIMO communication system may include a plurality of codeword matrices quantizing a particular space. Channel information may be shared and a precoding matrix may be determined based on a plurality of codeword matrices included in the codebook.

For example, although various codebooks are proposed for a case where a transmitter uses four transmit antennas, codebooks may not be defined for an example where the transmitter uses eight transmit antennas. Hereinafter, various codebooks for various examples of a base station, having various numbers of antennas, in a downlink, are described.

A set Y of DFT matrices may be expressed by the following Equation operation 5.

$$\Upsilon = \{ F^{(0)} \ \dots \ F^{(2^B-1)} \} \quad \text{[Equation operation 5]}$$

$$F^{(b)} = [ f_0^{(b)} \ \dots \ f_{n_t-1}^{(b)} ]$$

$$f_m^{(b)} = [ f_{0m}^{(b)} \ \dots \ f_{(n_t-1)m}^{(b)} ]^T$$

$$f_{nm}^{(b)} = \frac{1}{\sqrt{n_t}} \exp\left\{ j\frac{2\pi n}{n_t}\left(m + \frac{b}{G}\right)\right\}$$

In Equation operation 5, "B" refers to a number of feedback bits, and thus, Y may include $2^B$ elements. Among the elements of Y, $F^{(b)}$ may include "$n_t$" column vectors. In this example, "$n_t$" refers to a number of transmit antennas. Column vector $f_m^{(b)}$ may include "$n_t$" elements, and G may be defined by $2^B$.

1. An Example of DFT Matrices where Four Transmit Antennas are Used

Among DFT matrices for a case where four transmit antennas are used, two DFT matrices $F^{(0)}$ and $F^{(1)}$ may be expressed by the following Equation operation 6.

$$F^{(0)} = \frac{1}{\sqrt{4}} \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix} \quad \text{[Equation operation 6]}$$

$$F^{(1)} = \frac{1}{\sqrt{4}} \begin{bmatrix} 1 & 1 & 1 & 1 \\ e^{j\pi/4} & e^{j3\pi/4} & e^{j5\pi/4} & e^{j7\pi/4} \\ e^{j2\pi/4} & e^{j6\pi/4} & e^{j10\pi/4} & e^{j14\pi/4} \\ e^{j3\pi/4} & e^{j9\pi/4} & e^{j15\pi/4} & e^{j21\pi/4} \end{bmatrix} = \frac{1}{\sqrt{4}} \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

2. An Example of a Block Diagonal Matrix Including 16 Vectors Each Having a Dimension of 8×1

When the two DFT matrices $F^{(0)}$ and $F^{(1)}$ are generated, a block diagonal matrix may be generated and may be expressed by the following Equation 7. The block diagonal matrix may be a combination of the two DFT matrices $F^{(0)}$ and $F^{(1)}$, and zero matrix $0_{4\times4}$. Zero matrix $0_{4\times4}$ refers to a 4×4 matrix, and all elements of $0_{4\times4}$ are zeros.

$$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix} \quad \text{[Equation 7]}$$

The block diagonal matrix $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

may correspond to combination of $$\begin{bmatrix} F^{(0)} & 0_{4\times4} \\ 0_{4\times4} & F^{(0)} \end{bmatrix} \text{ and } \begin{bmatrix} F^{(1)} & 0_{4\times4} \\ 0_{4\times4} & F^{(1)} \end{bmatrix}$$

which are provided in a block diagonal structure. In this example, block diagonal matrix $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

may have a dimension of 8×1, and may include 16 column vectors each having a dimension of 8×1.

3. Example of a Four-Bit Codebook for Transmission Rank 1 in a Case where Eight Transmit Antennas are Used Based on Only Block Diagonal Matrix $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

The four-bit codebook for an example where eight transmit antennas are used may be generated based on only the block diagonal matrix $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}.$$

The four-bit codebook for the transmission rank 1 may include, as codeword matrices, all of the 16 column vectors with a dimension of 8×1 included in the block diagonal matrix $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}.$$

The codeword matrices c1, c2, c3, c4, c5, c6, c7, c8, c9, c10, c11, c12, c13, c14, c15, and c16 included in the four-bit codebook may be represented by the following Table 1.

TABLE 1

| | |
|---|---|
| c1 = | 0.5000 |
| | 0.5000 |
| | 0.5000 |
| | 0.5000 |
| | 0 |
| | 0 |
| | 0 |
| | 0 |
| c2 = | 0.5000 |
| | 0.0000 + 0.5000i |
| | −0.5000 + 0.0000i |
| | −0.0000 − 0.5000i |
| | 0 |
| | 0 |
| | 0 |
| | 0 |
| c3 = | 0.5000 |
| | −0.5000 + 0.0000i |
| | 0.5000 − 0.0000i |
| | −0.5000 + 0.0000i |
| | 0 |
| | 0 |
| | 0 |
| | 0 |
| c4 = | 0.5000 |
| | −0.0000 − 0.5000i |
| | −0.5000 + 0.0000i |
| | 0.0000 + 0.5000i |
| | 0 |
| | 0 |
| | 0 |
| | 0 |
| c5 = | 0.5000 |
| | 0.3536 + 0.3536i |
| | 0.0000 + 0.5000i |
| | −0.3536 + 0.3536i |
| | 0 |
| | 0 |
| | 0 |
| | 0 |
| c6 = | 0.5000 |
| | −0.3536 + 0.3536i |
| | −0.0000 − 0.5000i |
| | 0.3536 + 0.3536i |
| | 0 |
| | 0 |
| | 0 |
| | 0 |
| c7 = | 0.5000 |
| | −0.3536 − 0.3536i |
| | 0.0000 + 0.5000i |
| | 0.3536 − 0.3536i |
| | 0 |
| | 0 |
| | 0 |
| | 0 |
| c8 = | 0.5000 |
| | 0.3536 − 0.3536i |
| | −0.0000 − 0.5000i |
| | −0.3536 − 0.3536i |
| | 0 |
| | 0 |
| | 0 |
| | 0 |
| c9 = | 0 |
| | 0 |
| | 0 |
| | 0 |
| | 0.5000 |
| | 0.5000 |
| | 0.5000 |
| | 0.5000 |
| c10 = | 0 |
| | 0 |
| | 0 |
| | 0 |
| | 0.5000 |
| | 0.0000 + 0.5000i |
| | −0.5000 + 0.0000i |
| | −0.0000 − 0.5000i |
| c11 = | 0 |
| | 0 |
| | 0 |
| | 0 |
| | 0.5000 |
| | −0.5000 + 0.0000i |
| | 0.5000 − 0.0000i |
| | −0.5000 + 0.0000i |
| c12 = | 0 |
| | 0 |

TABLE 1-continued

| | |
|---|---|
| | 0 |
| | 0 |
| | 0.5000 |
| | −0.0000 − 0.5000i |
| | −0.5000 + 0.0000i |
| | 0.0000 + 0.5000i |
| c13 = | 0 |
| | 0 |
| | 0 |
| | 0 |
| | 0.5000 |
| | 0.3536 + 0.3536i |
| | 0.0000 + 0.5000i |
| | −0.3536 + 0.3536i |
| c14 = | 0 |
| | 0 |
| | 0 |
| | 0 |
| | 0.5000 |
| | −0.3536 + 0.3536i |

TABLE 1-continued

| | |
|---|---|
| | −0.0000 − 0.5000i |
| | 0.3536 + 0.3536i |
| c15 = | 0 |
| | 0 |
| | 0 |
| | 0 |
| | 0.5000 |
| | −0.3536 − 0.3536i |
| | 0.0000 + 0.5000i |
| | 0.3536 − 0.3536i |
| c16 = | 0 |
| | 0 |
| | 0 |
| | 0 |
| | 0.5000 |
| | 0.3536 − 0.3536i |
| | −0.0000 − 0.5000i |
| | −0.3536 − 0.3536i |

4. An Example of a Four-Bit Codebook for a Transmission Rank where Eight Transmit Antennas are Used Based on Block Diagonal Matrix $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

and a Rotation Matrix

Figure 3:
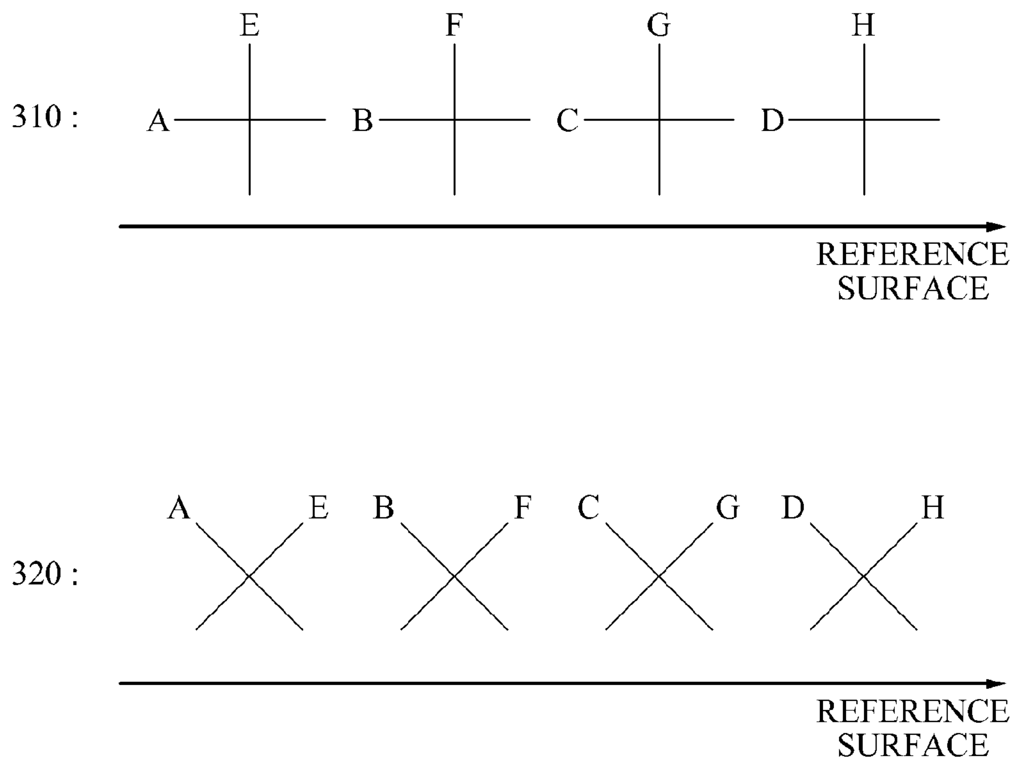
FIG. 3 is a diagram illustrating an example of transmit antennas installed in a base station.

FIG. 3 illustrates an example of transmit antennas installed in a base station.

Referring to FIG. 3, eight transmit antennas A, B, C, D, E, F, G, and H are arranged in various forms. Referring to diagram 310 of FIG. 3, among the eight transmit antennas A, B, C, D, E, F, G, and H, four transmit antennas A, B, C, and D are horizontal with respect to a reference surface, and the remaining four transmit antennas E, F, G, and H are vertical with respect to the reference surface. When the eight transmit antennas A, B, C, D, E, F, G, and H are arranged as shown in the example diagram 310, a codebook shown in above Table 1 may be appropriate. When the eight transmit antennas A, B, C, D, E, F, G, and H are arranged as shown in diagram 320, the codebook shown in above Table 1 may be inappropriate.

Referring to the diagram 320, the four transmit antennas A, B, C, and D are rotated by −45 degrees with respect to the reference surface, and the remaining four transmit antennas E, F, G, and H are rotated by +45 degrees with respect to the reference surface. For example, the antenna arrangement of the diagram 310 is rotated by 45 degrees. A rotation matrix U corresponding to the above rotation may be expressed by the following Equation 8:

$$U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix} \quad \text{[Equation 8]}$$

The rotation matrix U may be generated by rotating the block diagonal matrix of Equation 7 according to the rotation of transmit antennas. Changing a sign of "sin" from "−" to "+", or from "+" to "−" may not affect performance of the codebook. As the sign of "sin" is changed, indexes of the transmit antennas may be changed. Also, as an index order of transmit antenna may be changed, and a location of "sin" may be changed.

When the block diagonal matrix of Equation 7 is rotated according to the rotation matrix U of Equation 8, the rotated block diagonal matrix may be expressed by the following Equation 9.

$$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix} \quad \text{[Equation 9]}$$

In Equation 9, $$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

may include 16 column vectors, and the 16 column vectors may be codeword matrices of the four-bit codebook.

The codeword matrices c1, c2, c3, c4, c5, c6, c7, c8, c9, c10, c11, c12, c13, c14, c15, and c16 for transmission rank 1, generated based on $$U\begin{bmatrix} F^{(0)} & 0_{4\times 4} & F^{(1)} & 0_{4\times 4} \\ 0_{4\times 4} & F^{(0)} & 0_{4\times 4} & F^{(1)} \end{bmatrix},$$

may be represented by the following Table 2.

TABLE 2

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.3536 + 0.0000i |
| | 0.3536 − 0.0000i |
| | −0.3536 + 0.0000i |
| | 0.3536 |
| | −0.3536 + 0.0000i |
| | 0.3536 − 0.0000i |
| | −0.3536 + 0.0000i |
| c4 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c5 = | −0.3536 |
| | −0.3536 |
| | −0.3536 |
| | −0.3536 |
| | 0.3536 |
| | 0.3536 |
| | 0.3536 |
| | 0.3536 |
| c6 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c7 = | −0.3536 |
| | 0.3536 − 0.0000i |
| | −0.3536 + 0.0000i |
| | 0.3536 − 0.0000i |
| | 0.3536 |
| | −0.3536 + 0.0000i |
| | 0.3536 − 0.0000i |
| | −0.3536 + 0.0000i |
| c8 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c9 = | 0.3536 |
| | 0.2500 + 0.2500i |
| | 0.0000 + 0.3536i |
| | −0.2500 + 0.2500i |
| | 0.3536 |
| | 0.2500 + 0.2500i |
| | 0.0000 + 0.3536i |
| | −0.2500 + 0.2500i |
| c10 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c11 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c12 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c13 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c14 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |
| c15 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c16 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |

5. An Example of a Four-Bit Codebook for Transmission Rank 1, Generated Based on $$U\begin{bmatrix} F^{(0)} & 0_{4\times 4} & F^{(1)} & 0_{4\times 4} \\ 0_{4\times 4} & F^{(0)} & 0_{4\times 4} & F^{(1)} \end{bmatrix}$$

and Additional Random Vectors

As described above, the four-bit codebook for transmission rank 1 may include, as codeword matrices, 16 vectors included in $$U\begin{bmatrix} F^{(0)} & 0_{4\times 4} & F^{(1)} & 0_{4\times 4} \\ 0_{4\times 4} & F^{(0)} & 0_{4\times 4} & F^{(1)} \end{bmatrix}.$$

A new four-bit codebook for transmission rank 1 may be generated by replacing pre-defined random vectors for a predetermined number of vectors from among the 16 vectors included in $$U\begin{bmatrix} F^{(0)} & 0_{4\times 4} & F^{(1)} & 0_{4\times 4} \\ 0_{4\times 4} & F^{(0)} & 0_{4\times 4} & F^{(1)} \end{bmatrix}.$$

For example, 12 vectors may be selected from the 16 vectors included in $$U\begin{bmatrix} F^{(0)} & 0_{4\times 4} & F^{(1)} & 0_{4\times 4} \\ 0_{4\times 4} & F^{(0)} & 0_{4\times 4} & F^{(1)} \end{bmatrix}.$$

For example, 12 codeword matrices c1, c2, c4, c6, c8, c10, c11, c12, c13, c14, c15, and c16 may be selected from Table 2, and four vectors shown in the following Equation 10 may be added.

[Equation 10]

$$\frac{1}{\sqrt{8}}\begin{bmatrix} 1 \\ \frac{(1-j)}{\sqrt{2}} \\ \frac{(1-j)}{\sqrt{2}} \\ -j \\ -j \\ \frac{(-1-j)}{\sqrt{2}} \\ \frac{(-1-j)}{\sqrt{2}} \\ -1 \end{bmatrix}, \frac{1}{\sqrt{8}}\begin{bmatrix} 1 \\ -j \\ \frac{(-1-j)}{\sqrt{2}} \\ \frac{(-1+j)}{\sqrt{2}} \\ j \\ 1 \\ \frac{(1-j)}{\sqrt{2}} \\ \frac{(-1-j)}{\sqrt{2}} \end{bmatrix}, \frac{1}{\sqrt{8}}\begin{bmatrix} 1 \\ \frac{(1+j)}{\sqrt{2}} \\ \frac{(-1+j)}{\sqrt{2}} \\ -1 \\ -j \\ \frac{(1-j)}{\sqrt{2}} \\ \frac{(1+j)}{\sqrt{2}} \\ j \end{bmatrix}, \frac{1}{\sqrt{8}}\begin{bmatrix} 1 \\ 1 \\ \frac{(1+j)}{\sqrt{2}} \\ \frac{(1+j)}{\sqrt{2}} \\ j \\ j \\ \frac{(-1+j)}{\sqrt{2}} \\ \frac{(-1+j)}{\sqrt{2}} \end{bmatrix}$$

The new four-bit codebook for transmission rank 1 may include, as codeword matrices, four vectors as shown in Equation 10 and 12 codeword matrices c1, c2, c4, c6, c8, c10, c11, c12, c13, c14, c15, and c16 as shown in Table 2. When codeword matrices included in the new four-bit codebook for transmission rank 1 are renumbered, the new four-bit codebook for transmission rank 1 may be expressed by the following Table 3.

TABLE 3

| | |
|---|---|
| c1 = | 0.3536 |
| | 0.3536 |
| | 0.3536 |
| | 0.3536 |
| | 0.3536 |
| | 0.3536 |
| | 0.3536 |
| | 0.3536 |
| c2 = | 0.3536 |
| | 0.0000 + 0.3536i |
| | −0.3536 + 0.0000i |
| | −0.0000 − 0.3536i |
| | 0.3536 |
| | 0.0000 + 0.3536i |
| | −0.3536 + 0.0000i |
| | −0.0000 − 0.3536i |
| c3 = | 0.3536 |
| | −0.0000 − 0.3536i |
| | −0.3536 + 0.0000i |
| | 0.0000 + 0.3536i |
| | 0.3536 |
| | −0.0000 − 0.3536i |
| | −0.3536 + 0.0000i |
| | 0.0000 + 0.3536i |
| c4 = | −0.3536 |
| | −0.0000 − 0.3536i |
| | 0.3536 − 0.0000i |
| | 0.0000 + 0.3536i |
| | 0.3536 |
| | 0.0000 + 0.3536i |
| | −0.3536 + 0.0000i |
| | −0.0000 − 0.3536i |
| c5 = | −0.3536 |
| | 0.0000 + 0.3536i |
| | 0.3536 − 0.0000i |
| | −0.0000 − 0.3536i |
| | 0.3536 |
| | −0.0000 − 0.3536i |
| | −0.3536 + 0.0000i |
| | 0.0000 + 0.3536i |
| c6 = | 0.3536 |
| | −0.2500 + 0.2500i |
| | −0.0000 − 0.3536i |
| | 0.2500 + 0.2500i |
| | 0.3536 |
| | −0.2500 + 0.2500i |
| | −0.0000 − 0.3536i |
| | 0.2500 + 0.2500i |
| c7 = | 0.3536 |
| | −0.2500 − 0.2500i |
| | 0.0000 + 0.3536i |
| | 0.2500 − 0.2500i |
| | 0.3536 |
| | −0.2500 − 0.2500i |
| | 0.0000 + 0.3536i |
| | 0.2500 − 0.2500i |
| c8 = | 0.3536 |
| | 0.2500 − 0.2500i |
| | −0.0000 − 0.3536i |
| | −0.2500 − 0.2500i |
| | 0.3536 |
| | 0.2500 − 0.2500i |
| | −0.0000 − 0.3536i |
| | −0.2500 − 0.2500i |
| c9 = | −0.3536 |
| | −0.2500 − 0.2500i |
| | −0.0000 − 0.3536i |
| | 0.2500 − 0.2500i |
| | 0.3536 |
| | 0.2500 + 0.2500i |
| | 0.0000 + 0.3536i |
| | −0.2500 + 0.2500i |
| c10 = | −0.3536 |
| | 0.2500 − 0.2500i |
| | 0.0000 + 0.3536i |
| | −0.2500 − 0.2500i |
| | 0.3536 |
| | −0.2500 + 0.2500i |
| | −0.0000 − 0.3536i |
| | 0.2500 + 0.2500i |

TABLE 3-continued

| | |
|---|---|
| c11 = | −0.3536 |
| | 0.2500 + 0.2500i |
| | −0.0000 − 0.3536i |
| | −0.2500 + 0.2500i |
| | 0.3536 |
| | −0.2500 − 0.2500i |
| | 0.0000 + 0.3536i |
| | 0.2500 − 0.2500i |
| c12 = | −0.3536 |
| | −0.2500 + 0.2500i |
| | 0.0000 + 0.3536i |
| | 0.2500 + 0.2500i |
| | 0.3536 |
| | 0.2500 − 0.2500i |
| | −0.0000 − 0.3536i |
| | −0.2500 − 0.2500i |
| c13 = | 0.3536 + 0.0000i |
| | 0.2500 − 0.2500i |
| | 0.2500 − 0.2500i |
| | 0.0000 − 0.3536i |
| | 0.0000 − 0.3536i |
| | −0.2500 − 0.2500i |
| | −0.2500 − 0.2500i |
| | −0.3536 − 0.0000i |
| c14 = | 0.3536 + 0.0000i |
| | 0.0000 − 0.3536i |
| | −0.2500 − 0.2500i |
| | −0.2500 + 0.2500i |
| | −0.0000 + 0.3536i |
| | 0.3536 + 0.0000i |
| | 0.2500 − 0.2500i |
| | −0.2500 − 0.2500i |
| c15 = | 0.3536 + 0.0000i |
| | 0.2500 + 0.2500i |
| | −0.2500 + 0.2500i |
| | −0.3536 − 0.0000i |
| | 0.0000 − 0.3536i |
| | 0.2500 − 0.2500i |
| | 0.2500 + 0.2500i |
| | −0.0000 + 0.3536i |
| c16 = | 0.3536 + 0.0000i |
| | 0.3536 + 0.0000i |
| | 0.2500 + 0.2500i |
| | 0.2500 + 0.2500i |
| | −0.0000 + 0.3536i |
| | −0.0000 + 0.3536i |
| | −0.2500 + 0.2500i |
| | −0.2500 + 0.2500i |

6. An Example of Four-Bit Codebooks for Transmission Rank 2

As shown in Table 1 to Table 3, four-bit codebooks for transmission rank 1 may be designed. Four-bit codebooks for transmission rank 2 may be designed based on the four-bit codebooks for transmission rank 1.

A four-bit codebook for transmission rank 2 may be generated based on the above Table 2.

The four-bit codebook for transmission rank 2 may be designed by pairing two corresponding matrices among 16 codeword matrices shown in Table 2. For example, 16 codeword matrices shown in Table 2 may be paired as follows:

1: [1 5]
2: [2 6]
3: [3 7]
4: [4 8]
5: [1 13]
6: [2 14]
7: [3 15]
8: [4 16]
9: [5 9]
10: [6 10]
11: [7 11]
12: [8 12]
13: [9 13]
14: [10 14]
15: [11 15]
16: [12 16]

For A: [a, b], "A" denotes an $A^{th}$ codeword matrix included in the four-bit codebook for transmission rank 2, "a" denotes an $a^{th}$ codeword matrix shown in Table 2, and "b" denotes a $b^{th}$ codeword matrix shown in Table 2.

Codeword matrices included in the four-bit codebook for transmission rank 2 may be defined by the following Table 4.

TABLE 4

| | | |
|---|---|---|
| c1 = | 0.3536 | −0.3536 |
| | 0.3536 | −0.3536 |
| | 0.3536 | −0.3536 |
| | 0.3536 | −0.3536 |
| | 0.3536 | 0.3536 |
| | 0.3536 | 0.3536 |
| | 0.3536 | 0.3536 |
| | 0.3536 | 0.3536 |
| c2 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c3 = | 0.3536 | −0.3536 |
| | −0.3536 + 0.0000i | 0.3536 − 0.0000i |
| | 0.3536 − 0.0000i | −0.3536 + 0.0000i |
| | −0.3536 + 0.0000i | 0.3536 − 0.0000i |
| | 0.3536 | 0.3536 |
| | −0.3536 + 0.0000i | −0.3536 + 0.0000i |
| | 0.3536 − 0.0000i | 0.3536 − 0.0000i |
| | −0.3536 + 0.0000i | −0.3536 + 0.0000i |
| c4 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c5 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c6 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c7 = | 0.3536 | −0.3536 |
| | −0.3536 + 0.0000i | 0.2500 + 0.2500i |
| | 0.3536 − 0.0000i | −0.0000 − 0.3536i |
| | −0.3536 + 0.0000i | −0.2500 + 0.2500i |
| | 0.3536 | 0.3536 |
| | −0.3536 + 0.0000i | −0.2500 − 0.2500i |
| | 0.3536 − 0.0000i | 0.0000 + 0.3536i |
| | −0.3536 + 0.0000i | 0.2500 − 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c9 = | 0.3536 | −0.3536 |
| | 0.2500 + 0.2500i | −0.3536 |
| | 0.0000 + 0.3536i | −0.3536 |

TABLE 4-continued

| | | |
|---|---|---|
| | −0.2500 + 0.2500i | −0.3536 |
| | 0.3536 | 0.3536 |
| | 0.2500 + 0.2500i | 0.3536 |
| | 0.0000 + 0.3536i | 0.3536 |
| | −0.2500 + 0.2500i | 0.3536 |
| c10 = | 0.3536 | −0.3536 |
| | −0.2500 + 0.2500i | −0.0000 − 0.3536i |
| | −0.0000 − 0.3536i | 0.3536 − 0.0000i |
| | 0.2500 + 0.2500i | 0.0000 + 0.3536i |
| | 0.3536 | 0.3536 |
| | −0.2500 + 0.2500i | 0.0000 + 0.3536i |
| | −0.0000 − 0.3536i | −0.3536 + 0.0000i |
| | 0.2500 + 0.2500i | −0.0000 − 0.3536i |
| c11 = | 0.3536 | −0.3536 |
| | −0.2500 − 0.2500i | 0.3536 − 0.0000i |
| | 0.0000 + 0.3536i | −0.3536 + 0.0000i |
| | 0.2500 − 0.2500i | 0.3536 − 0.0000i |
| | 0.3536 | 0.3536 |
| | −0.2500 − 0.2500i | −0.3536 + 0.0000i |
| | 0.0000 + 0.3536i | 0.3536 − 0.0000i |
| | 0.2500 − 0.2500i | −0.3536 + 0.0000i |
| c12 = | 0.3536 | −0.3536 |
| | 0.2500 − 0.2500i | 0.0000 + 0.3536i |
| | −0.0000 − 0.3536i | 0.3536 − 0.0000i |
| | −0.2500 − 0.2500i | −0.0000 − 0.3536i |
| | 0.3536 | 0.3536 |
| | 0.2500 − 0.2500i | −0.0000 − 0.3536i |
| | −0.0000 − 0.3536i | −0.3536 + 0.0000i |
| | −0.2500 − 0.2500i | 0.0000 + 0.3536i |
| c13 = | 0.3536 | −0.3536 |
| | 0.2500 + 0.2500i | −0.2500 − 0.2500i |
| | 0.0000 + 0.3536i | −0.0000 − 0.3536i |
| | −0.2500 + 0.2500i | 0.2500 − 0.2500i |
| | 0.3536 | 0.3536 |
| | 0.2500 + 0.2500i | 0.2500 + 0.2500i |
| | 0.0000 + 0.3536i | 0.0000 + 0.3536i |
| | −0.2500 + 0.2500i | −0.2500 + 0.2500i |
| c14 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c15 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 −0.2500i |
| c16 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |

A four-bit codebook for transmission rank 2 may be generated based on the above Table 3.

The four-bit codebook for transmission rank 2 may be generated by appropriately pairing two corresponding matrices among codeword matrices shown in Table 3, as follows:

1: [2 4]
2: [3 5]
3: [6 10]
4: [7 11]
5: [8 12]
6: [1 9]
7: [2 10]
8: [3 12]
9: [4 6]
10: [5 8]
11: [1 11]
12: [7 9]
13: [13 15]
14: [13 16]
15: [14 15]
16: [14 16]

For A: [a, b], "A" denotes an $A^{th}$ codeword matrix included in the four-bit codebook for transmission rank 2, "a" denotes an $a^{th}$ codeword matrix shown in Table 3, and "b" denotes a $b^{th}$ codeword matrix shown in Table 3. Codeword matrices included in the four-bit codebook for transmission rank 2 may be defined by the following Table 5:

TABLE 5

| | | |
|---|---|---|
| c1 = | 0.3536 | −0.3536 |
| | 0.0000 + 0.3536i | −0.0000 − 0.3536i |
| | −0.3536 + 0.0000i | 0.3536 − 0.0000i |
| | −0.0000 − 0.3536i | 0.0000 + 0.3536i |
| | 0.3536 | 0.3536 |
| | 0.0000 + 0.3536i | 0.0000 + 0.3536i |
| | −0.3536 + 0.0000i | −0.3536 + 0.0000i |
| | −0.0000 − 0.3536i | −0.0000 − 0.3536i |
| c2 = | 0.3536 | −0.3536 |
| | −0.0000 − 0.3536i | 0.0000 + 0.3536i |
| | −0.3536 + 0.0000i | 0.3536 − 0.0000i |
| | 0.0000 + 0.3536i | −0.0000 − 0.3536i |
| | 0.3536 | 0.3536 |
| | −0.0000 − 0.3536i | −0.0000 − 0.3536i |
| | −0.3536 + 0.0000i | −0.3536 + 0.0000i |
| | 0.0000 + 0.3536i | 0.0000 + 0.3536i |
| c3 = | 0.3536 | −0.3536 |
| | −0.2500 + 0.2500i | 0.2500 − 0.2500i |
| | −0.0000 − 0.3536i | 0.0000 + 0.3536i |
| | 0.2500 + 0.2500i | −0.2500 − 0.2500i |
| | 0.3536 | 0.3536 |
| | −0.2500 + 0.2500i | −0.2500 + 0.2500i |
| | −0.0000 − 0.3536i | −0.0000 − 0.3536i |
| | 0.2500 + 0.2500i | 0.2500 + 0.2500i |
| c4 = | 0.3536 | −0.3536 |
| | −0.2500 − 0.2500i | 0.2500 + 0.2500i |
| | 0.0000 + 0.3536i | −0.0000 − 0.3536i |
| | 0.2500 − 0.2500i | −0.2500 + 0.2500i |
| | 0.3536 | 0.3536 |
| | −0.2500 − 0.2500i | −0.2500 − 0.2500i |
| | 0.0000 + 0.3536i | 0.0000 + 0.3536i |
| | 0.2500 − 0.2500i | 0.2500 − 0.2500i |
| c5 = | 0.3536 | −0.3536 |
| | 0.2500 − 0.2500i | −0.2500 + 0.2500i |
| | −0.0000 − 0.3536i | 0.0000 + 0.3536i |
| | −0.2500 − 0.2500i | 0.2500 + 0.2500i |
| | 0.3536 | 0.3536 |
| | 0.2500 − 0.2500i | 0.2500 − 0.2500i |
| | −0.0000 − 0.3536i | −0.0000 − 0.3536i |
| | −0.2500 − 0.2500i | −0.2500 − 0.2500i |
| c6 = | 0.3536 | −0.3536 |
| | 0.3536 | −0.2500 − 0.2500i |
| | 0.3536 | −0.0000 − 0.3536i |
| | 0.3536 | 0.2500 − 0.2500i |
| | 0.3536 | 0.3536 |
| | 0.3536 | 0.2500 + 0.2500i |
| | 0.3536 | 0.0000 + 0.3536i |
| | 0.3536 | −0.2500 + 0.2500i |
| c7 = | 0.3536 | −0.3536 |
| | 0.0000 + 0.3536i | 0.2500 − 0.2500i |
| | −0.3536 + 0.0000i | 0.0000 + 0.3536i |
| | −0.0000 − 0.3536i | −0.2500 − 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c8 = | 0.3536 | −0.3536 |
| | −0.0000 − 0.3536i | −0.2500 + 0.2500i |
| | −0.3536 + 0.0000i | 0.0000 + 0.3536i |
| | 0.0000 + 0.3536i | 0.2500 + 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |

TABLE 5-continued

| | | |
|---|---|---|
| c9 = | −0.3536 | 0.3536 |
| | −0.0000 − 0.3536i | −0.2500 + 0.2500i |
| | 0.3536 − 0.0000i | −0.0000 − 0.3536i |
| | 0.0000 + 0.3536i | 0.2500 + 0.2500i |
| | 0.3536 | 0.3536 |
| | 0.0000 + 0.3536i | −0.2500 + 0.2500i |
| | −0.3536 + 0.0000i | −0.0000 − 0.3536i |
| | −0.0000 − 0.3536i | 0.2500 + 0.2500i |
| c10 = | −0.3536 | 0.3536 |
| | 0.0000 + 0.3536i | 0.2500 − 0.2500i |
| | 0.3536 − 0.0000i | −0.0000 − 0.3536i |
| | −0.0000 − 0.3536i | −0.2500 − 0.2500i |
| | 0.3536 | 0.3536 |
| | −0.0000 − 0.3536i | 0.2500 − 0.2500i |
| | −0.3536 + 0.0000i | −0.0000 − 0.3536i |
| | 0.0000 + 0.3536i | −0.2500 − 0.2500i |
| c11 = | 0.3536 | −0.3536 |
| | 0.3536 | 0.2500 + 0.2500i |
| | 0.3536 | −0.0000 − 0.3536i |
| | 0.3536 | −0.2500 + 0.2500i |
| | 0.3536 | 0.3536 |
| | 0.3536 | −0.2500 − 0.2500i |
| | 0.3536 | 0.0000 + 0.3536i |
| | 0.3536 | 0.2500 − 0.2500i |
| c12 = | 0.3536 | −0.3536 |
| | −0.2500 − 0.2500i | −0.2500 − 0.2500i |
| | 0.0000 + 0.3536i | −0.0000 − 0.3536i |
| | 0.2500 − 0.2500i | 0.2500 − 0.2500i |
| | 0.3536 | 0.3536 |
| | −0.2500 − 0.2500i | 0.2500 + 0.2500i |
| | 0.0000 + 0.3536i | 0.0000 + 0.3536i |
| | 0.2500 − 0.2500i | −0.2500 + 0.2500i |
| c13 = | 0.3536 + 0.0000i | 0.3536 + 0.0000i |
| | 0.2500 − 0.2500i | 0.2500 + 0.2500i |
| | 0.2500 − 0.2500i | −0.2500 + 0.2500i |
| | 0.0000 − 0.3536i | −0.3536 − 0.0000i |
| | 0.0000 − 0.3536i | 0.0000 − 0.3536i |
| | −0.2500 − 0.2500i | 0.2500 − 0.2500i |
| | −0.2500 − 0.2500i | 0.2500 + 0.2500i |
| | −0.3536 − 0.0000i | −0.0000 + 0.3536i |
| c14 = | 0.3536 + 0.0000i | 0.3536 + 0.0000i |
| | 0.2500 − 0.2500i | 0.3536 + 0.0000i |
| | 0.2500 − 0.2500i | 0.2500 + 0.2500i |
| | 0.0000 − 0.3536i | 0.2500 + 0.2500i |
| | 0.0000 − 0.3536i | −0.0000 + 0.3536i |
| | −0.2500 − 0.2500i | −0.0000 + 0.3536i |
| | −0.2500 − 0.2500i | −0.2500 + 0.2500i |
| | −0.3536 − 0.0000i | −0.2500 + 0.2500i |
| c15 = | 0.3536 + 0.0000i | 0.3536 + 0.0000i |
| | 0.0000 − 0.3536i | 0.2500 + 0.2500i |
| | −0.2500 − 0.2500i | −0.2500 + 0.2500i |
| | −0.2500 + 0.2500i | −0.3536 − 0.0000i |
| | −0.0000 + 0.3536i | 0.0000 − 0.3536i |
| | 0.3536 + 0.0000i | 0.2500 − 0.2500i |
| | 0.2500 − 0.2500i | 0.2500 + 0.2500i |
| | −0.2500 − 0.2500i | −0.0000 + 0.3536i |
| c16 = | 0.3536 + 0.0000i | 0.3536 + 0.0000i |
| | 0.0000 − 0.3536i | 0.3536 + 0.0000i |
| | −0.2500 − 0.2500i | 0.2500 + 0.2500i |
| | −0.2500 + 0.2500i | 0.2500 + 0.2500i |
| | −0.0000 + 0.3536i | −0.0000 + 0.3536i |
| | 0.3536 + 0.0000i | −0.0000 + 0.3536i |
| | 0.2500 − 0.2500i | −0.2500 + 0.2500i |
| | −0.2500 − 0.2500i | −0.2500 + 0.2500i |

Figure 4:
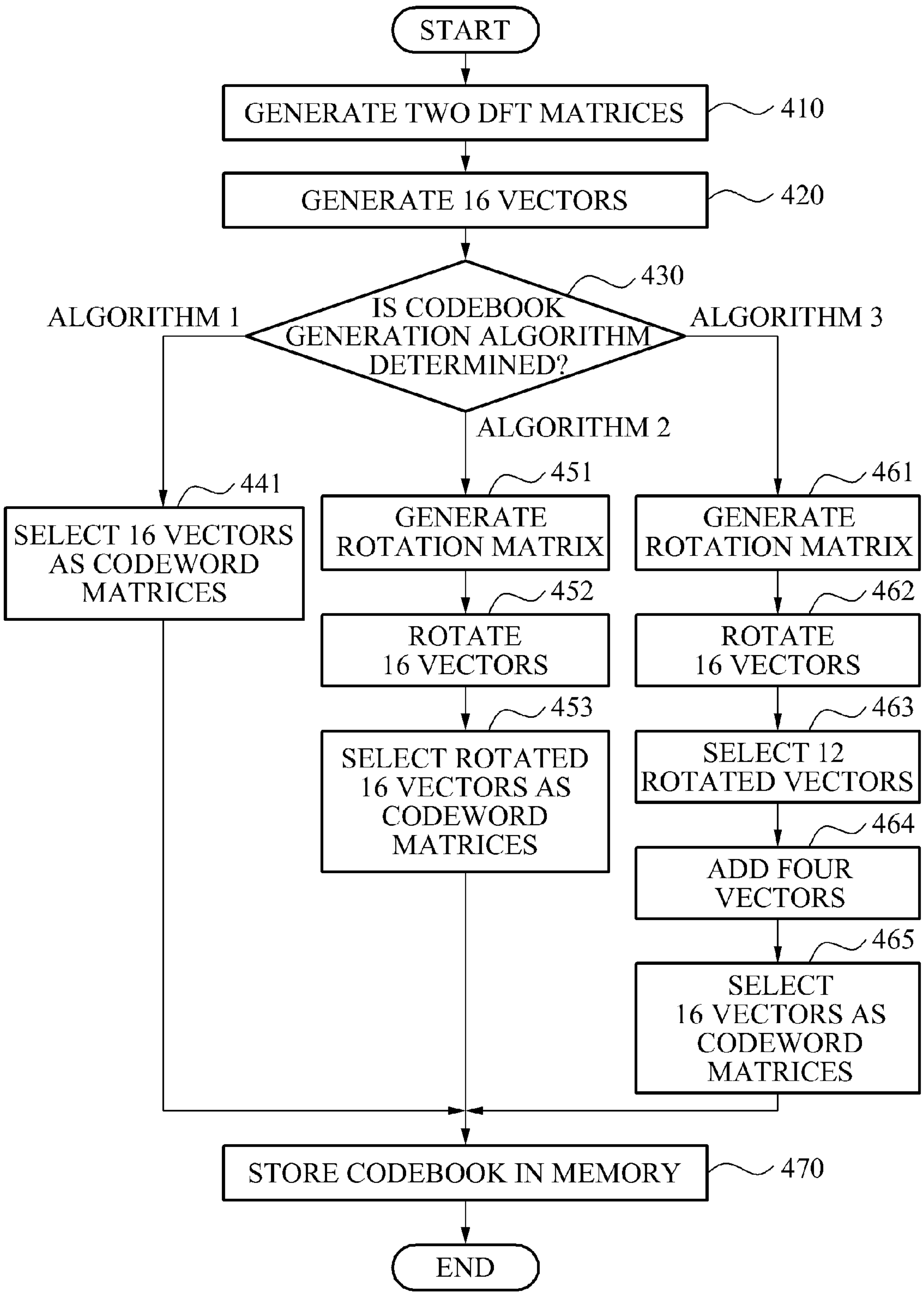
FIG. 4 is a diagram illustrating an example of a codebook design method.

FIG. 4 illustrates an example of a codebook design method.

In operation 410, two DFT matrices are generated. IN this example, two DFT matrices $F^{(0)}$ and $F^{(1)}$ and shown in Equation operation 6 are generated, and each of the two DFT matrices $F^{(0)}$ and $F^{(1)}$ have a dimension of 4×4.

In operation 420, 16 vectors each having a dimension of 8×1 are generated based on the two DFT matrices $F^{(0)}$ and $F^{(1)}$.

The 16 vectors each having a dimension of 8×1 may be obtained by configuring block diagonal matrix $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

shown in Equation 7.

In operation 430, a codebook generation algorithm is determined. In this example, algorithms 1, 2, and 3 are used. When algorithm 1 is determined, in operation 441, all of 16 vectors each having a dimension of 8×1 shown in Table 1 are selected as codeword matrices of a 4-bit codebook for transmission rank 1.

When algorithm 2 is determined, in operation 451 a rotation matrix corresponding to an arrangement structure of transmit antennas is generated. In operation 452, $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

is rotated based on the rotation matrix. In operation 453, rotated 16 vectors are selected as codeword matrices of the four-bit codebook for transmission rank 1.

When algorithm 3 is determined, in operation 461 a rotation matrix corresponding to an arrangement structure of transmit antennas is generated. In operation 462, $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

is rotated based on the rotation matrix. In operation 463, 12 vectors are selected from the rotated 16 vectors, and four pre-defined vectors are added in operation 464. In operation 465, 12 vectors and four vectors are selected as codeword matrices to generate a new four-bit codebook for transmission rank 1.

In operation 470, at least one codebook among the four-bit codebooks for transmission rank 1 is stored in a storage medium, for example, a memory.

Figure 5:
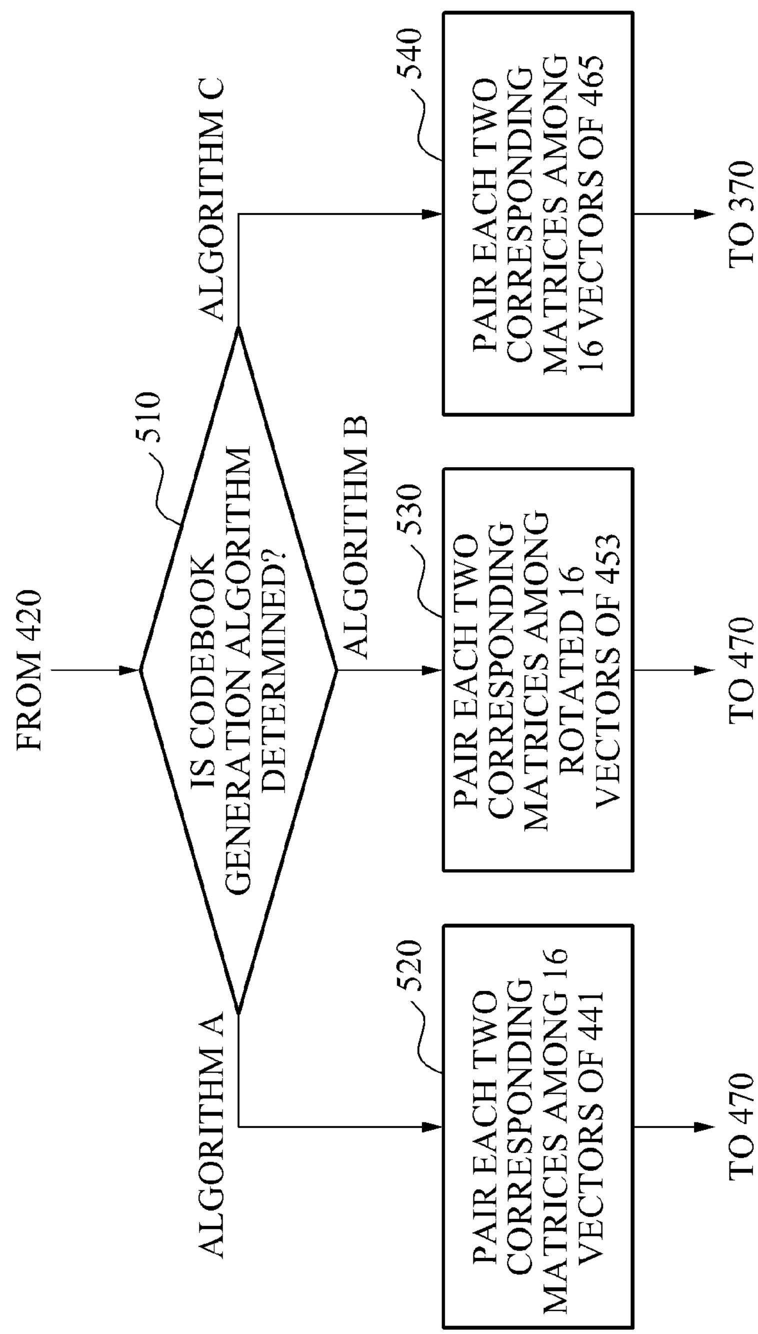
FIG. 5 is a diagram illustrating another example of a codebook design method.

FIG. 5 illustrates an example of a codebook design method for transmission rank 2.

Referring to FIG. 5, in operation 510, a codebook generation algorithm is determined to generate a codebook for transmission rank 2. In this example, algorithms A, B, and C are used.

When algorithm A is determined, in operation 520 two corresponding matrices among 16 vectors generated in operation 441 of FIG. 4 are paired.

When algorithm B is determined, in operation 530 two corresponding matrices among 16 vectors generated in operation 453 of FIG. 4, for example, 16 vectors shown in Table 1, are paired. Accordingly, the four-bit codebook for transmission rank 2 as shown in Table 4 may be generated according to algorithm B.

When algorithm C is determined, in operation 540 two corresponding matrices among 16 vectors generated in operation 465, for example, 16 vectors shown in Table 2, are paired. Accordingly, the four-bit codebook for transmission rank 2 as shown in Table 5 may be generated according to algorithm C.

Figure 6:
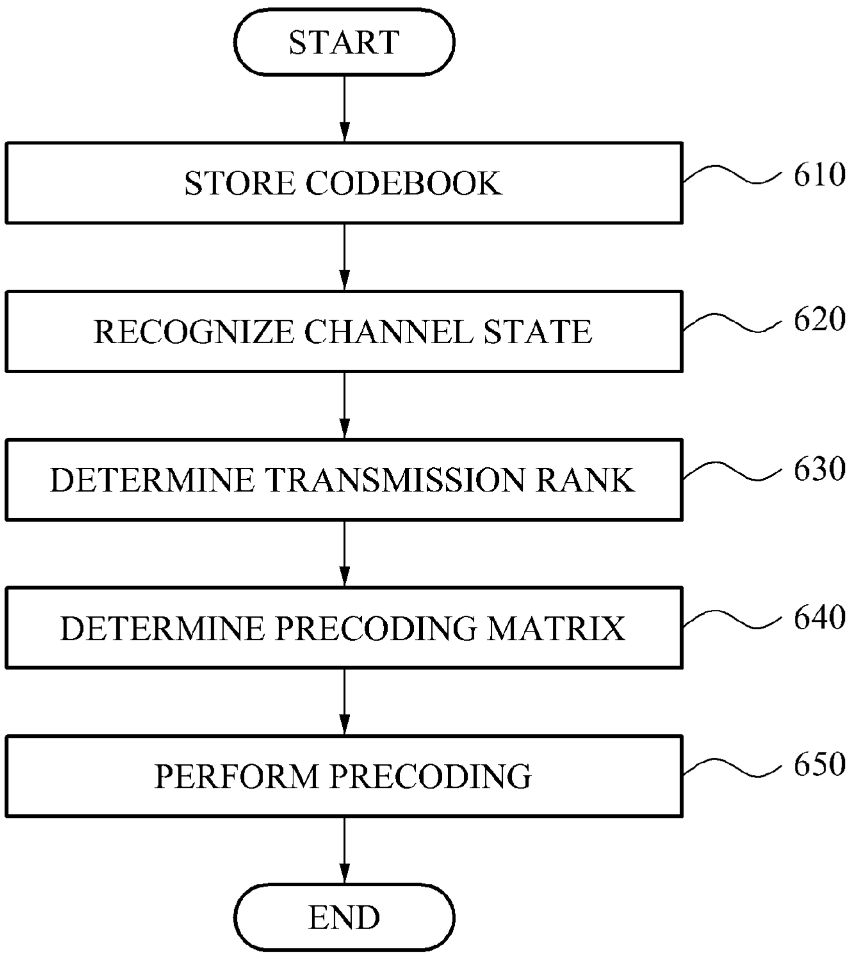
FIG. 6 is a diagram illustrating an example of a closed-loop MIMO communication method.

FIG. 6 illustrates an example of a closed-loop MIMO communication method.

Referring to FIG. 6, in operation 610, a transmitter, for example, a base station in a downlink or a terminal in the downlink, stores at least one of codebooks generated from the aforementioned process. The transmitter and the receiver may store and use the same codebook.

In operation 620, the transmitter and the receiver recognize a state of a channel formed between the transmitter and the receiver.

For example, in the downlink, the base station may transmit a known pilot signal to the terminal, and the terminal may use the pilot signal to detect the channel formed between the base station and the terminal. The terminal may select a preferred codeword matrix from codeword matrices included in the codebook, based on the detected channel. The terminal may transmit index information of the preferred codeword matrix to the base station as feedback information. The base station may recognize the preferred codeword matrix of the terminal from the codebook, based on the feedback information.

In operation 630, the transmitter and the receiver adaptively determine a transmission rank. For example, the transmitter and the receiver may determine the transmission rank based on an achievable total sum of data rates, a channel state, a preferred transmission rank of the receiver, and the like.

In operation 640, the transmitter determines a precoding matrix based on a plurality of codeword matrices, for example, the preferred codeword matrix included in the codebook, and the transmission rank.

In operation 650, the transmitter precodes at least one data stream based on the determined precoding matrix.

Figure 7:
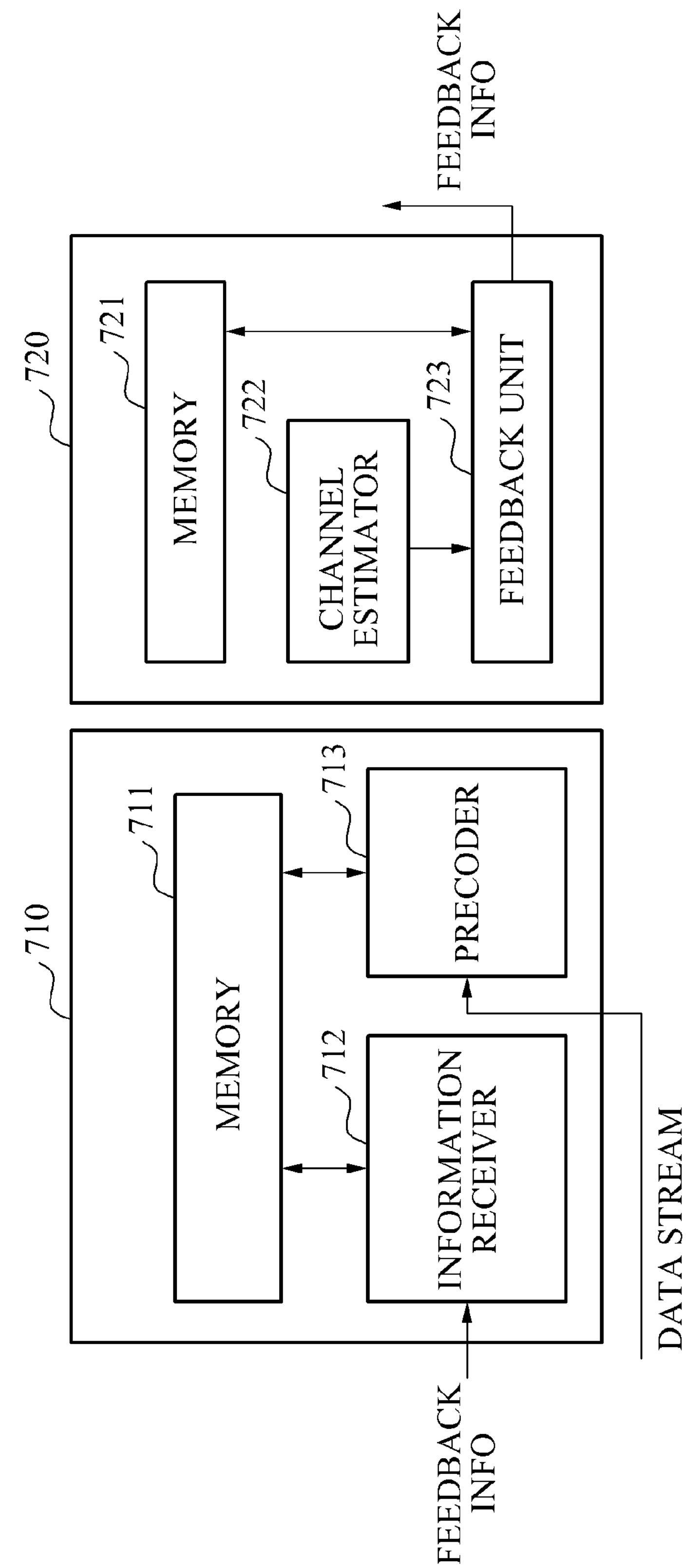
FIG. 7 is a diagram illustrating an example of a transmitter and a receiver.

FIG. 7 illustrates an example of a transmitter and a receiver.

Referring to FIG. 7, a transmitter 710 for a MIMO communication system includes a memory 711, an information receiver 712, and a precoder 713. A receiver 720 includes a memory 721, a channel estimator 722, and a feedback unit 723.

The memory 711 of the transmitter 710 and the memory 721 of the receiver 720 may store at least one codebook including a plurality of codeword matrices.

The channel estimator 722 may use a known signal to detect a channel. The feedback unit 723 may select a preferred codeword matrix from the plurality of codeword matrices based on the detected channel. The feedback unit 723 may feed back, to the transmitter 710, index information of the preferred codeword matrix as feedback information.

The information receiver 712 may receive the feedback information, and the precoder 713 may verify the preferred codeword matrix based on the feedback information. The precoder 713 may generate a precoding matrix based on the preferred codeword matrix and precode at least one data stream based on the precoding matrix.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable lapop and/or tablet personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmitter for a multiple-input multiple-output (MIMO) communication system, the transmitter comprising:

a memory configured to store a codebook comprising at least one of 8×1 codeword matrices c1, c2, c3, c4, c5, c6, c7, c8, c9, c10, c11, c12, c13, c14, c15, and c16;

wherein the codeword matrices c1, c2, c3, c4, c5, c6, c7, c8, c9, c10, c11, c12, c13, c14, c15, and c16 are generated based on a matrix $$\begin{bmatrix} F^{(0)} & 0_{4\times 4} & F^{(1)} & 0_{4\times 4} \\ 0_{4\times 4} & F^{(0)} & 0_{4\times 4} & F^{(1)} \end{bmatrix} \left( F^{(0)} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}, \right.$$

-continued $$F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}\Bigg)\Bigg);$$

and a precoder configured to precode a data stream to be transmitted based on one of the generated codeword matrices.

2. The transmitter of claim 1, wherein the precoder is further configured to:

calculate a precoding matrix based on at least one codeword matrix among the codeword matrices c1, c2, c3, c4, c5, c6, c7, c8, c9, c10, c11, c12, c13, c14, c15, and c16; and precode the data stream based on the precoding matrix.

3. The transmitter of claim 1, further comprising:

an information receiver configured to receive, from a receiver, feedback information associated with the at least one codeword matrix, wherein the precoder is further configured to precode the data stream based on the feedback information and the codebook.

4. The transmitter of claim 3, wherein the precoder is further configured to:

calculate a precoding matrix based on a codeword matrix corresponding to the feedback information among the codeword matrices c1, c2, c3, c4, c5, c6, c7, c8, c9, c10, c11, c12, c13, c14, c15, and c16; and precode the data stream based on the precoding matrix.

5. The transmitter of claim 3, wherein the feedback information comprises information associated with an index of a codeword matrix preferred by the receiver.

6. The transmitter of claim 1, wherein the transmitter comprises eight transmit antennas.

7. A transmitter for a multiple-input multiple-output (MIMO) communication system, the transmitter comprising:

a memory configured to store a codebook comprising at least one of 8×1 codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are generated based on a matrix $$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

$$\Bigg(U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix},$$

$$F^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}, F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}\Bigg);$$

and a precoder configured to precode a data stream to be transmitted based on one of the generated codeword matrices.

8. A transmitter for a multiple-input multiple-output (MIMO) communication system, the transmitter comprising:

a memory configured to store a codebook comprising at least one of 8×1 codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are generated based on $1^{st}$, $2^{nd}$, $4^{th}$, $6^{th}$, $8^{th}$, $10^{th}$, $11^{th}$, $12^{th}$, $13^{th}$, $14^{th}$, $15^{th}$ and $16^{th}$ column vectors of a matrix $$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

$$\left( U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix}, \right.$$

$$\left. F^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}, F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix} \right),$$

$$\frac{1}{\sqrt{8}}\begin{bmatrix} 1 \\ \frac{(1-j)}{\sqrt{2}} \\ \frac{(1-j)}{\sqrt{2}} \\ -j \\ -j \\ \frac{(-1-j)}{\sqrt{2}} \\ \frac{(-1-j)}{\sqrt{2}} \\ -1 \end{bmatrix}, \frac{1}{\sqrt{8}}\begin{bmatrix} 1 \\ -j \\ \frac{(-1-j)}{\sqrt{2}} \\ \frac{(-1+j)}{\sqrt{2}} \\ j \\ 1 \\ \frac{(1-j)}{\sqrt{2}} \\ \frac{(-1-j)}{\sqrt{2}} \end{bmatrix}, \frac{1}{\sqrt{8}}\begin{bmatrix} 1 \\ \frac{(1+j)}{\sqrt{2}} \\ \frac{(-1+j)}{\sqrt{2}} \\ -1 \\ -j \\ \frac{(1-j)}{\sqrt{2}} \\ \frac{(1+j)}{\sqrt{2}} \\ j \end{bmatrix}, \frac{1}{\sqrt{8}}\begin{bmatrix} 1 \\ 1 \\ \frac{(1+j)}{\sqrt{2}} \\ \frac{(1+j)}{\sqrt{2}} \\ j \\ j \\ \frac{(-1+j)}{\sqrt{2}} \\ \frac{(-1+j)}{\sqrt{2}} \end{bmatrix};$$

and four vectors and a precoder configured to precode a data stream to be transmitted based on one of the generated codeword matrices.

9. A transmitter for a multiple-input multiple-output (MIMO) communication system, the transmitter comprising:

a memory configured to store a codebook comprising at least one of 8×2 codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are generated based on [1 5 ], [2 6 ], [3 7 ], [4 8 ], [1 13 ], [2 14 ], [3 15 ], [4 16 ], [5 9 ], [6 10 ], [7 11 ], [8 12 ], [9 13 ], [10 14 ], [11 15 ] and [12 16 ] of matrix $$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

$$\left( U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix}, \right.$$

-continued $$F^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}, F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix} \Bigg),$$

wherein [a b] means combination of $a^{th}$ column vector and $b^{th}$ column vector; and a precoder configured to precode a data stream to be transmitted based on the generated codeword matrices.

10. A transmitter for a multiple-input multiple-output (MIMO) communication system, the transmitter comprising:

a memory configured to store a codebook comprising at least one of 8×2 codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are generated based on $1^{t}$, $2^{nd}$, $4^{th}$, $6^{th}$, $8^{th}$, $10^{th}$, $11^{th}$, $12^{th}$, $13^{th}$, $14^{th}$, $15^{th}$ and $16^{th}$ column vectors of a matrix $$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

$$\Bigg( U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix},$$

$$F^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}, F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix} \Bigg)$$

and four vectors
$$\frac{1}{\sqrt{8}}\begin{bmatrix} 1 \\ \frac{(1-j)}{\sqrt{2}} \\ \frac{(1-j)}{\sqrt{2}} \\ -j \\ -j \\ \frac{(-1-j)}{\sqrt{2}} \\ \frac{(-1-j)}{\sqrt{2}} \\ -1 \end{bmatrix}, \frac{1}{\sqrt{8}}\begin{bmatrix} 1 \\ -j \\ \frac{(-1-j)}{\sqrt{2}} \\ \frac{(-1+j)}{\sqrt{2}} \\ j \\ 1 \\ \frac{(1-j)}{\sqrt{2}} \\ \frac{(-1-j)}{\sqrt{2}} \end{bmatrix}, \frac{1}{\sqrt{8}}\begin{bmatrix} 1 \\ \frac{(1+j)}{\sqrt{2}} \\ \frac{(-1+j)}{\sqrt{2}} \\ -1 \\ -j \\ \frac{(1-j)}{\sqrt{2}} \\ \frac{(1+j)}{\sqrt{2}} \\ j \end{bmatrix}, \frac{1}{\sqrt{8}}\begin{bmatrix} 1 \\ 1 \\ \frac{(1+j)}{\sqrt{2}} \\ \frac{(1+j)}{\sqrt{2}} \\ j \\ j \\ \frac{(-1+j)}{\sqrt{2}} \\ \frac{(-1+j)}{\sqrt{2}} \end{bmatrix},$$

and four vectors wherein [a b] means combination of $a^{th}$ column vector and $b^{th}$ column vector; and a precoder configured to precode a data stream to be transmitted based on one of the generated codeword matrices.

11. A receiver for a multiple-input multiple-output (MIMO) communication system, the receiver comprising:

a memory configured to store a codebook comprising at least one of 8×1 codeword matrices c1, c2, c3, c4, c5, c6, c7, c8, c9, c10, c11, c12, c13, c14, c15, and c16; and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are generated based on a matrix $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

$$\left( f^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}, F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix} \right).$$

12. A receiver for a multiple-input multiple-output (MIMO) communication system, the receiver comprising:

a memory configured to store a codebook comprising at least one of 8×1 codeword matrices c1, c2, c3, c4, c5, c6, c7, c8, c9, c10, c11, c12, c13, c14, c15, and c16; and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are generated based on a matrix $$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

$$\left( U = \begin{bmatrix} \cos(45^\circ) & 0 & 0 & 0 & -\sin(45^\circ) & 0 & 0 & 0 \\ 0 & \cos(45^\circ) & 0 & 0 & 0 & -\sin(45^\circ) & 0 & 0 \\ 0 & 0 & \cos(45^\circ) & 0 & 0 & 0 & -\sin(45^\circ) & 0 \\ 0 & 0 & 0 & \cos(45^\circ) & 0 & 0 & 0 & -\sin(45^\circ) \\ \sin(45^\circ) & 0 & 0 & 0 & \cos(45^\circ) & 0 & 0 & 0 \\ 0 & \sin(45^\circ) & 0 & 0 & 0 & \cos(45^\circ) & 0 & 0 \\ 0 & 0 & \sin(45^\circ) & 0 & 0 & 0 & \cos(45^\circ) & 0 \\ 0 & 0 & 0 & \sin(45^\circ) & 0 & 0 & 0 & \cos(45^\circ) \end{bmatrix}, \right.$$

$$\left. F^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}, F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix} \right),$$

13. A receiver for a multiple-input multiple-output (MIMO) communication system, the receiver comprising:

a memory configured to store a codebook comprising at least one of 8×1 codeword matrices c1, c2, c3, c4, c5, c6, c7, c8, c9, c10, c11, c12, c13, c14, c15, and c16; and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are generated based on $1^{st}$, $2^{nd}$, $4^{th}$, $6^{th}$, $8^{th}$, $10^{th}$, $11^{th}$, $12^{th}$, $13^{th}$, $14^{th}$, $15^{th}$ and $16^{th}$ column vectors of a matrix $$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

$$\left( U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix}, \right.$$

$$\left. F^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}, F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix} \right),$$

and four vectors
$$\frac{1}{\sqrt{8}}\begin{bmatrix} 1 \\ \frac{(1-j)}{\sqrt{2}} \\ \frac{(1-j)}{\sqrt{2}} \\ -j \\ -j \\ \frac{(-1-j)}{\sqrt{2}} \\ \frac{(-1-j)}{\sqrt{2}} \\ -1 \end{bmatrix}, \frac{1}{\sqrt{8}}\begin{bmatrix} 1 \\ -j \\ \frac{(-1-j)}{\sqrt{2}} \\ \frac{(-1+j)}{\sqrt{2}} \\ j \\ 1 \\ \frac{(1-j)}{\sqrt{2}} \\ \frac{(-1-j)}{\sqrt{2}} \end{bmatrix}, \frac{1}{\sqrt{8}}\begin{bmatrix} 1 \\ \frac{(1+j)}{\sqrt{2}} \\ \frac{(-1+j)}{\sqrt{2}} \\ -1 \\ -j \\ \frac{(1-j)}{\sqrt{2}} \\ \frac{(1+j)}{\sqrt{2}} \\ j \end{bmatrix}, \frac{1}{\sqrt{8}}\begin{bmatrix} 1 \\ 1 \\ \frac{(1+j)}{\sqrt{2}} \\ \frac{(1+j)}{\sqrt{2}} \\ j \\ j \\ \frac{(-1+j)}{\sqrt{2}} \\ \frac{(-1+j)}{\sqrt{2}} \end{bmatrix}.$$

and four vectors.

14. A receiver for a multiple-input multiple-output (MIMO) communication system, the receiver comprising:

a memory configured to store a codebook comprising at least one of 8×2 codeword matrices c1, c2, c3, c4, c5, c6, c7, c8, c9, c10, c11, c12, c13, c14, c15, and c16; and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are generated based on [1 5 ], [2 6 ], [3 7 ], [4 8 ], [1 13 ], [2 14 ], [3 15 ], [4 16 ], [5 9 ], [6 10 ], [7 11 ], [8 12 ], [9 13 ], [10 14 ], [11 15 ] and [12 16 ] of matrix $$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

$$\left( U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix}, \right.$$

$$\left. F^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}, F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix} \right),$$

wherein [a b] mean combination of $a^{th}$ column vector and $b^{th}$ column vector.

15. A receiver for a multiple-input multiple-output (MIMO) communication system, the receiver comprising:

a memory configured to store a codebook comprising at least one of 8×2 codeword matrices c1, c2, c3, c4, c5, c6, c7, c8, c9, c10, c11, c12, c13, c14, c15, and c16; and a feedback unit configured to provide, to a transmitter, feedback information associated with a preferred codeword matrix among the codeword matrices c1, c2, c3, c4, c5, c6, c7, c8, c9, c10, c11, c12, c13, c14, c15, and c16, wherein the codeword matrices c1, c2, c3, c4, c5, c6, c7, c8, c9, c10, c11, c12, c13, c14, c15, and c16 are generated based on $1^{st}$, $2^{nd}$, $4^{th}$, $6^{th}$, $8^{th}$, $10^{th}$, $11^{th}$, $12^{th}$, $13^{th}$, $14^{th}$, $15^{th}$ and $16^{th}$ column vectors of a matrix $$U\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

$$\left( U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix}, \right.$$

$$\left. F^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}, F^{(1)} = \frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix} \right),$$

-continued and four vectors $\frac{1}{\sqrt{8}}\begin{bmatrix}1\\ \frac{(1-j)}{\sqrt{2}}\\ \frac{(1-j)}{\sqrt{2}}\\ -j\\ -j\\ \frac{(-1-j)}{\sqrt{2}}\\ \frac{(-1-j)}{\sqrt{2}}\\ -1\end{bmatrix}, \frac{1}{\sqrt{8}}\begin{bmatrix}1\\ -j\\ \frac{(-1-j)}{\sqrt{2}}\\ \frac{(-1+j)}{\sqrt{2}}\\ j\\ 1\\ \frac{(1-j)}{\sqrt{2}}\\ \frac{(-1-j)}{\sqrt{2}}\end{bmatrix}, \frac{1}{\sqrt{8}}\begin{bmatrix}1\\ \frac{(1+j)}{\sqrt{2}}\\ \frac{(-1+j)}{\sqrt{2}}\\ -1\\ -j\\ \frac{(1-j)}{\sqrt{2}}\\ \frac{(1+j)}{\sqrt{2}}\\ j\end{bmatrix}, \frac{1}{\sqrt{8}}\begin{bmatrix}1\\ 1\\ \frac{(1+j)}{\sqrt{2}}\\ \frac{(1+j)}{\sqrt{2}}\\ j\\ j\\ \frac{(-1+j)}{\sqrt{2}}\\ \frac{(-1+j)}{\sqrt{2}}\end{bmatrix},$ and four vectors wherein [a b] means combination of $a^{th}$ column vector and $b^{th}$ column vector.

16. A codebook design method for a base station comprising at least eight transmit antennas, the codebook design method comprising:

generating, using a processor block-diagonal matrix $$\begin{bmatrix} F^{(0)} & 0_{4\times4} & F^{(1)} & 0_{4\times4} \\ 0_{4\times4} & F^{(0)} & 0_{4\times4} & F^{(1)} \end{bmatrix}$$

comprising 16 vectors each having a dimension of 8×1 based on a 4×4 zero matrix and 4×4 discrete Fourier transform (DFT) matrix $$F^{(0)} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix} \text{and } F^{(1)} =$$

-continued $$\frac{1}{\sqrt{4}}\begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix};$$

designing a codebook comprising a plurality of codeword matrices based on at least one of the 16 vectors; and storing the codebook in a memory.

17. The codebook design method of claim 16, wherein the designing comprises:

rotating the 16 vectors using a rotation matrix $$U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix}$$

corresponding to an angle, according to arrangement of transmit antennas; and selecting all of the rotated 16 vectors as the codeword matrices.

18. The codebook design method of claim 16, wherein the designing comprises:

rotating the 16 vectors using a rotation matrix $$U = \begin{bmatrix} \cos(45^\circ) & 0 & 0 & 0 & -\sin(45^\circ) & 0 & 0 & 0 \\ 0 & \cos(45^\circ) & 0 & 0 & 0 & -\sin(45^\circ) & 0 & 0 \\ 0 & 0 & \cos(45^\circ) & 0 & 0 & 0 & -\sin(45^\circ) & 0 \\ 0 & 0 & 0 & \cos(45^\circ) & 0 & 0 & 0 & -\sin(45^\circ) \\ \sin(45^\circ) & 0 & 0 & 0 & \cos(45^\circ) & 0 & 0 & 0 \\ 0 & \sin(45^\circ) & 0 & 0 & 0 & \cos(45^\circ) & 0 & 0 \\ 0 & 0 & \sin(45^\circ) & 0 & 0 & 0 & \cos(45^\circ) & 0 \\ 0 & 0 & 0 & \sin(45^\circ) & 0 & 0 & 0 & \cos(45^\circ) \end{bmatrix}$$

corresponding to an angle, according to arrangement of transmit antennas;

extracting $1^{st}$, $2^{nd}$, $4^{th}$, $6^{th}$, $8^{th}$, $10^{th}$, $11^{th}$, $12^{th}$, $13^{th}$, $14^{th}$, $15^{th}$ and $16^{th}$ column vectors from the rotated 16vectors; and selecting, as the codeword matrices, the extracted column vetors and four vectors $$\frac{1}{\sqrt{8}}\begin{bmatrix} 1 \\ \frac{(1-j)}{\sqrt{2}} \\ \frac{(1-j)}{\sqrt{2}} \\ -j \\ -j \\ \frac{(-1-j)}{\sqrt{2}} \\ \frac{(-1-j)}{\sqrt{2}} \\ -1 \end{bmatrix}, \frac{1}{\sqrt{8}}\begin{bmatrix} 1 \\ -j \\ \frac{(-1-j)}{\sqrt{2}} \\ \frac{(-1+j)}{\sqrt{2}} \\ j \\ 1 \\ \frac{(1-j)}{\sqrt{2}} \\ \frac{(-1-j)}{\sqrt{2}} \end{bmatrix}, \frac{1}{\sqrt{8}}\begin{bmatrix} 1 \\ \frac{(1+j)}{\sqrt{2}} \\ \frac{(-1+j)}{\sqrt{2}} \\ -1 \\ -j \\ \frac{(1-j)}{\sqrt{2}} \\ \frac{(1+j)}{\sqrt{2}} \\ j \end{bmatrix}, \frac{1}{\sqrt{8}}\begin{bmatrix} 1 \\ 1 \\ \frac{(1+j)}{\sqrt{2}} \\ \frac{(1+j)}{\sqrt{2}} \\ j \\ j \\ \frac{(-1+j)}{\sqrt{2}} \\ \frac{(-1+j)}{\sqrt{2}} \end{bmatrix}.$$

19. The codebook design method of claim 16, wherein the designing comprises:

rotating the 16 vectors using a rotation matrix $$U = \begin{bmatrix} \cos(45^\circ) & 0 & 0 & 0 & -\sin(45^\circ) & 0 & 0 & 0 \\ 0 & \cos(45^\circ) & 0 & 0 & 0 & -\sin(45^\circ) & 0 & 0 \\ 0 & 0 & \cos(45^\circ) & 0 & 0 & 0 & -\sin(45^\circ) & 0 \\ 0 & 0 & 0 & \cos(45^\circ) & 0 & 0 & 0 & -\sin(45^\circ) \\ \sin(45^\circ) & 0 & 0 & 0 & \cos(45^\circ) & 0 & 0 & 0 \\ 0 & \sin(45^\circ) & 0 & 0 & 0 & \cos(45^\circ) & 0 & 0 \\ 0 & 0 & \sin(45^\circ) & 0 & 0 & 0 & \cos(45^\circ) & 0 \\ 0 & 0 & 0 & \sin(45^\circ) & 0 & 0 & 0 & \cos(45^\circ) \end{bmatrix}$$

corresponding to an angle, according to arrangement of transmit antennas; and selecting, as the codeword matrices, [1 5 ], [2 6 ], [3 7 ], [4 8 ], [1 13 ], [2 14 ], [3 15 ], [4 16 ], [5 9 ], [6 10 ], [7 11 ], [8 12 ], [9 13 ], [10 14 ], [11 15 ] and [12 16 ] of the rotated 16 vectors, wherein [a b] means combination of $a^{th}$ column vector and $b^{th}$ column vector.

20. The codebook design method of claim 16, wherein the designing comprises:

rotating the at least 16 vectors using a rotation matrix $$U = \begin{bmatrix} \cos(45°) & 0 & 0 & 0 & -\sin(45°) & 0 & 0 & 0 \\ 0 & \cos(45°) & 0 & 0 & 0 & -\sin(45°) & 0 & 0 \\ 0 & 0 & \cos(45°) & 0 & 0 & 0 & -\sin(45°) & 0 \\ 0 & 0 & 0 & \cos(45°) & 0 & 0 & 0 & -\sin(45°) \\ \sin(45°) & 0 & 0 & 0 & \cos(45°) & 0 & 0 & 0 \\ 0 & \sin(45°) & 0 & 0 & 0 & \cos(45°) & 0 & 0 \\ 0 & 0 & \sin(45°) & 0 & 0 & 0 & \cos(45°) & 0 \\ 0 & 0 & 0 & \sin(45°) & 0 & 0 & 0 & \cos(45°) \end{bmatrix}$$

corresponding to an angle, according to arrangement of transmit antennas;

extracting $1^{st}$, $2^{nd}$, $4^{th}$, $6^{th}$, $8^{th}$, $10^{th}$, $11^{th}$, $12^{th}$, $13^{th}$, $14^{th}$, $15^{th}$ and $16^{th}$ column vectors from the rotated 16 vectors;

determining a matrix from the extracted column vectors and four vectors $$\frac{1}{\sqrt{8}}\begin{bmatrix} 1 \\ \frac{(1-j)}{\sqrt{2}} \\ \frac{(1-j)}{\sqrt{2}} \\ -j \\ -j \\ \frac{(-1-j)}{\sqrt{2}} \\ \frac{(-1-j)}{\sqrt{2}} \\ -1 \end{bmatrix}, \frac{1}{\sqrt{8}}\begin{bmatrix} 1 \\ -j \\ \frac{(-1-j)}{\sqrt{2}} \\ \frac{(-1+j)}{\sqrt{2}} \\ j \\ 1 \\ \frac{(1-j)}{\sqrt{2}} \\ \frac{(-1-j)}{\sqrt{2}} \end{bmatrix}, \frac{1}{\sqrt{8}}\begin{bmatrix} 1 \\ \frac{(1+j)}{\sqrt{2}} \\ \frac{(-1+j)}{\sqrt{2}} \\ -1 \\ -j \\ \frac{(1-j)}{\sqrt{2}} \\ \frac{(1+j)}{\sqrt{2}} \\ j \end{bmatrix}, \frac{1}{\sqrt{8}}\begin{bmatrix} 1 \\ 1 \\ \frac{(1+j)}{\sqrt{2}} \\ \frac{(1+j)}{\sqrt{2}} \\ j \\ j \\ \frac{(-1+j)}{\sqrt{2}} \\ \frac{(-1+j)}{\sqrt{2}} \end{bmatrix};$$

and selecting, as the codeword matrices, [2 4], [3 5], [6 10], [7 11], [8 12], [1 9], [2 10], [3 12], [4 6], [5 8], [1 11], [7 9], [13 15], [13 16], [14 15] and [14 16] of the matrix, wherein [a b] means combination of $a^{th}$ column vector and $b^{th}$ column vector.

* * * * *